United States Patent
Miyahara et al.

(10) Patent No.: US 11,440,997 B2
(45) Date of Patent: Sep. 13, 2022

(54) POLYARYLENE SULFIDE COPOLYMER AND METHOD OF PRODUCING THE SAME

(71) Applicant: Toray Industries, Inc., Tokyo (JP)

(72) Inventors: Yuichiro Miyahara, Nagoya (JP); Yuji Yamanaka, Nagoya (JP); Takeshi Unohara, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 180 days.

(21) Appl. No.: 16/962,954

(22) PCT Filed: Jan. 30, 2019

(86) PCT No.: PCT/JP2019/003077
§ 371 (c)(1),
(2) Date: Jul. 17, 2020

(87) PCT Pub. No.: WO2019/151288
PCT Pub. Date: Aug. 8, 2019

(65) Prior Publication Data
US 2020/0339755 A1  Oct. 29, 2020

(30) Foreign Application Priority Data

Jan. 31, 2018 (JP) .............................. JP2018-014435
Jun. 29, 2018 (JP) .............................. JP2018-124143

(51) Int. Cl.
*C08G 75/14* (2006.01)
*B29C 45/00* (2006.01)
*B29K 81/00* (2006.01)

(52) U.S. Cl.
CPC .......... *C08G 75/14* (2013.01); *B29C 45/0001* (2013.01); *B29K 2081/04* (2013.01)

(58) Field of Classification Search
CPC  C08G 73/1028; C08G 75/14; C08G 75/0204; B29K 2081/04
See application file for complete search history.

(56) References Cited

U.S. PATENT DOCUMENTS

| | | |
|---|---|---|
| 4,716,216 A | 12/1987 | Takekoshi et al. |
| 4,769,424 A | 9/1988 | Takekoshi et al. |
| 4,783,522 A | 11/1988 | Aritomi et al. |
| 4,935,473 A | 6/1990 | Fukuda et al. |
| 5,122,578 A | 6/1992 | Han et al. |
| 5,241,038 A | 8/1993 | Teegarden et al. |
| 5,486,442 A | 1/1996 | Takimoto et al. |
| 5,705,574 A * | 1/1998 | Lubowitz ............... C08G 73/14 528/289 |
| 6,080,822 A | 6/2000 | Haubs et al. |
| 8,785,571 B2 | 7/2014 | Kanomata et al. |
| 9,718,928 B2 | 8/2017 | Ichinose et al. |
| 9,840,596 B2 * | 12/2017 | Yamanaka ......... C08G 75/0213 |
| 10,040,910 B2 | 8/2018 | Yamashita et al. |
| 2012/0178898 A1 | 7/2012 | Unohara et al. |
| 2013/0079459 A1 | 3/2013 | Ramalingam et al. |

FOREIGN PATENT DOCUMENTS

| | | |
|---|---|---|
| CN | 1033640 A | 7/1989 |
| CN | 1205020 A | 1/1999 |
| CN | 102206343 A | 10/2011 |
| CN | 103180367 A | 6/2013 |
| CN | 104837809 A | 8/2015 |
| CN | 105992789 A | 10/2016 |
| CN | 107778769 A | 3/2018 |
| EP | 0 381 867 A2 | 8/1990 |
| EP | 0 452 705 A2 | 10/1991 |
| EP | 2 966 107 A1 | 1/2016 |
| EP | 3 088 443 A1 | 11/2016 |
| JP | 62-15228 A | 1/1987 |
| JP | 62-84124 A | 4/1987 |
| JP | 64-45433 A | 2/1989 |
| JP | 02-133428 A | 5/1990 |
| JP | 3-275723 A | 12/1991 |
| JP | 05-98007 A | 4/1993 |
| JP | 05-194738 A | 8/1993 |
| JP | 2004-168834 A | 6/2004 |
| JP | 2017-132839 A | 8/2017 |

OTHER PUBLICATIONS

The Extended European Search Report dated Oct. 6, 2021, of counterpart European Application No. 19746877.0.
L. Kuang et al., "Synthesis and Characterization of Poly(phenylene sulfide)-Poly(ether sulfone) Block Copolymers," Journal of Applied Polymer Science, John Wiley & Sons, Inc, US, vol. 16, No. 9, Aug. 1996, pp. 1607-1614.
The First Office Action dated Aug. 31, 2021, of counterpart Chinese Application No. 201980011019.7, along with an English translation.

* cited by examiner

*Primary Examiner* — Michael M Dollinger
(74) *Attorney, Agent, or Firm* — DLA Piper LLP (US)

(57) ABSTRACT

A polyarylene sulfide copolymer has a glass transition temperature of 95° C. or higher and 190° C. or lower and has a melting point of 300° C. or lower or does not have a melting point, as measured by differential scanning calorimetry, and the copolymer containing as a structural unit arylene sulfide units having a number average molecular weight (Mn) of 1,000 or more and 10,000 or less. The polyarylene sulfide copolymer can be provided with high physical stability such as in rigidity at high temperature and excellent moldability and chemical resistance.

15 Claims, No Drawings

POLYARYLENE SULFIDE COPOLYMER AND METHOD OF PRODUCING THE SAME

TECHNICAL FIELD

This disclosure relates to a polyarylene sulfide copolymer that maintains good melt moldability while preventing changes in physical properties at high temperatures.

BACKGROUND

Polyarylene sulfide (hereinafter abbreviated as "PAS"), represented by polyphenylene sulfide (hereinafter abbreviated as "PPS"), has excellent properties suitable for engineering plastics such as heat resistance, barrier properties, moldability, chemical resistance, electrical insulation, and wet heat resistance. PAS has suitable properties as an engineering plastic and is used mainly for injection and extrusion molding applications such as various electrical and electronic parts, machine parts, automotive parts, films, and fibers. The use of PAS has been expanding in recent years due to its excellent properties, and required to have stable physical properties under higher temperature conditions.

PPS, a typical PAS, is a crystalline polymer having a glass transition temperature of 80 to 90° C. and a melting point of 275 to 285° C. Having such an excellent heat resistance, PPS is often used under high temperature conditions. In addition, PPS dissolves in a very limited number of solvents only at high temperatures (200-250° C.), and is also widely used for applications that take advantage of such an excellent chemical resistance.

PPS, a typical example of the above-mentioned PAS, can withstand use at higher temperatures due to its high melting point, but rapidly decreases its rigidity at temperatures above the glass transition temperature which is 80-90° C. compared to temperatures below the glass transition temperature. Various studies have been carried out to improve the glass transition temperature of PAS. For example, in JP 2017-132839 A, the glass transition temperature of PAS has been improved by polymerizing a sulfoxide compound monomer containing a biphenyl structure to obtain a poly (arylene sulfonium salt) and dealkylating or dearylating it to introduce a rigid biphenyl structure into the main chain skeleton. In addition, JP H2-133428 A discloses a block copolymer having a polyphenylene sulfide moiety and a polyphenylene sulfide ketone moiety. JP H5-98007 A discloses a method of producing a PAS-based copolymer by depolymerizing PPS in a solvent using a sulfurizing agent, and reacting and polymerizing the depolymerized product with a dihalogenated compound having a ketone group. JP S62-84124 A discloses a crystalline polyimide containing a cumulative phenylene sulfide unit with its glass transition temperature improved by linking dimers to nonamers of phenylene sulfide and arylene groups via imide bonds.

Various studies have been carried out to improve the glass transition temperature of PAS. However, the method disclosed in JP '839 has certainly improved the glass transition temperature, but it has raised the melting point to 335° C. or higher, making it difficult to perform melt processing. The block copolymer disclosed in JP '428 has also had a too high melting point and thus had problems with moldability. The PAS-based copolymer obtained in the method disclosed in JP '007 has also had an improved glass transition temperature, but had an increased melting point, which makes it difficult to perform melt processing. The method disclosed in JP '124 has improved the glass transition temperature, but has degraded the chemical resistance that is a characteristic of PAS.

It could therefore be helpful to provide a polyarylene sulfide copolymer with high physical stability such as in rigidity at high temperature and excellent moldability and chemical resistance.

SUMMARY

We thus provide:

1. A polyarylene sulfide copolymer having a glass transition temperature of 95° C. or higher and 190° C. or lower, and having a melting point of 300° C. or lower, or not having a melting point, as measured by differential scanning calorimetry, wherein the copolymer comprises as a structural unit arylene sulfide units having a number average molecular weight (Mn) of 1,000 or more and 10,000 or less;

2. The polyarylene sulfide copolymer according to item 1, wherein the copolymer comprises as a structural unit at least one structure selected from formulae (a) to (j):

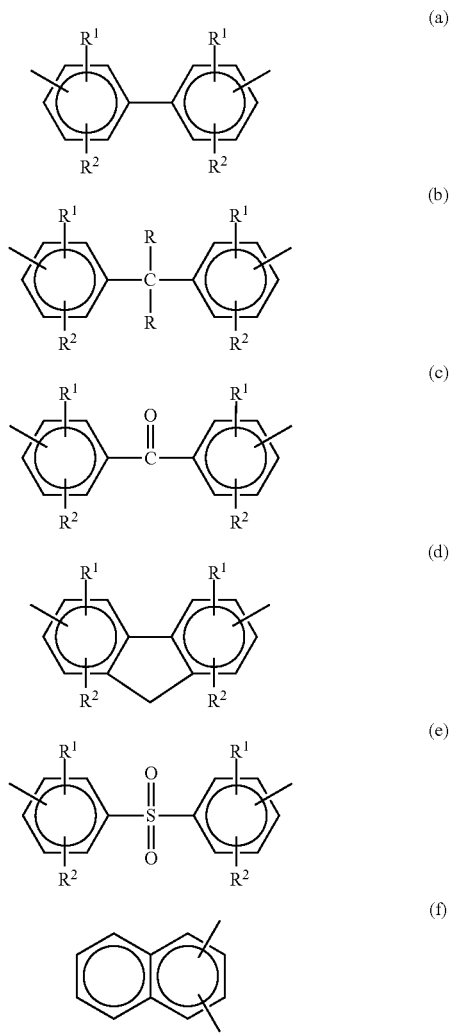

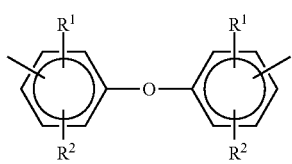 (g)

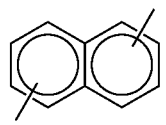 (h)

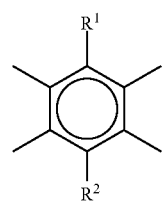 (i)

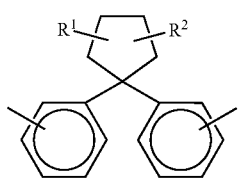 (j)

wherein R, $R^1$ and $R^2$, which are the same or different, each represent a substituent selected from hydrogen, a $C_{1-12}$ alkyl group, a $C_{6-24}$ aryl group, and a halogen group;

3. The polyarylene sulfide copolymer according to item 1 or 2, wherein the copolymer comprises at least one linking group selected from a sulfonyl group, a sulfinyl group, an ester group, an amide group, an imide group, an ether group, a urea group, a urethane group, and a siloxane group;

4. A method of producing the polyarylene sulfide copolymer according to any one of items 1 to 3, the method comprising:

mixing (A) an arylene sulfide prepolymer having a number average molecular weight (Mn) of 1,000 or more and 10,000 or less and (B) at least one compound selected from formulae (a') to (k'):

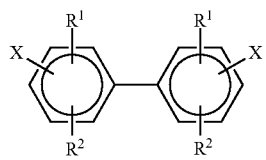 (a')

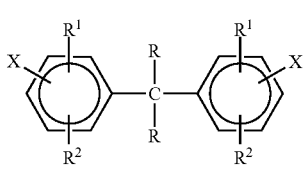 (b')

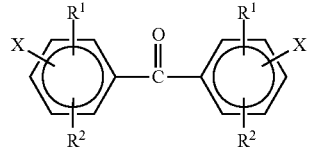 (c')

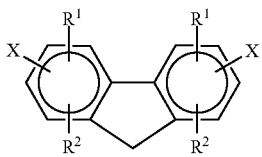 (d')

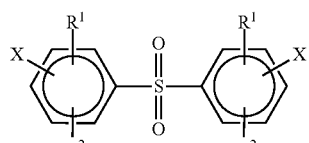 (e')

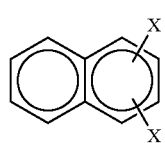 (f')

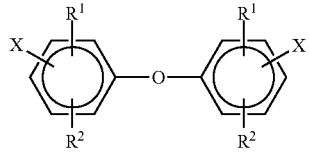 (g')

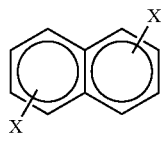 (h')

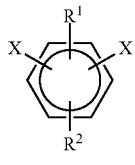 (i')

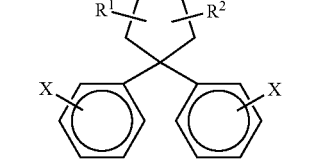 (j')

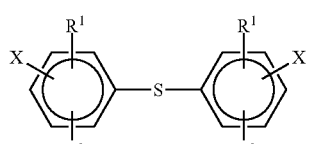 (k')

and heating the mixture;

wherein X is any one selected from a hydroxyl group, a carboxyl group, a silanol group, a sulfonic group, an amino group, an acid anhydride group, an acetamide group, a sulfonamide group, a cyano group, an isocyanate group, an aldehyde group, an acetyl group, an epoxy group, and an alkoxy silane group;

wherein R, $R^1$ and $R^2$, which are the same or different, each represent a substituent selected from hydrogen, a $C_{1-12}$ alkyl group, a $C_{6-24}$ aryl group, and a halogen group; and wherein optionally the aromatic ring in each compound is bi- or tri-substituted product and the two or more substituents X in the single substituted aromatic ring are the same or different;

5. The method of producing a polyarylene sulfide copolymer according to item 4, wherein the (A) arylene sulfide prepolymer has at least one functional group selected from a hydroxyl group, a carboxyl group, a silanol group, a sulfonic group, an amino group, an acid anhydride group, an acetamide group, a sulfonamide group, a cyano group, an isocyanate group, an aldehyde group, an acetyl group, an epoxy group, and an alkoxy silane group;

6. The method of producing a polyarylene sulfide copolymer according to item 4 or 5, wherein the combination of the functional group contained in the (A) arylene sulfide prepolymer and the substituent X contained in the (B) compound is an acid anhydride group and an amino group, respectively;

7. The method of producing a polyarylene sulfide copolymer according to any one of items 4 to 6, wherein the heating step is carried out under a substantially solvent-free condition;

8. A resin composition comprising the polyarylene sulfide copolymer according to any one of items 1 to 3;

9. A molded product comprising the polyarylene sulfide copolymer according to any one of items 1 to 3 or the resin composition according to item 8;

10. The molded product according to item 9, wherein the molded product is an aerospace component.

A polyarylene sulfide copolymer can thus be provided with improved physical stability such as in rigidity at high temperature and excellent moldability and chemical resistance.

DETAILED DESCRIPTION

Examples of our copolymers and methods will be described in detail below.

In selected examples, a polyarylene sulfide copolymer is a copolymer containing 70 mol % or more of a repeating unit represented by formula —(Ar—S)—, preferably containing 80 mol % or more. Examples of Ar include units represented by formulae (l) to (v), among which the unit represented by formula (l) is particularly preferred:

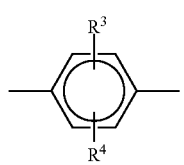
(l)

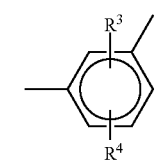
(m)

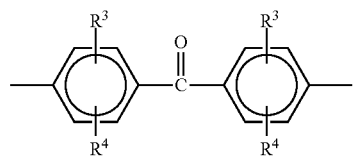
(n)

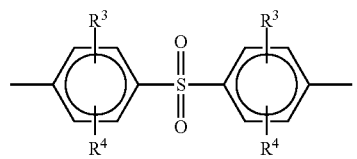
(o)

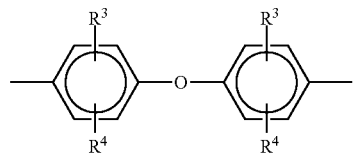
(p)

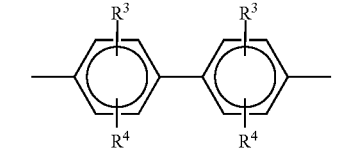
(q)

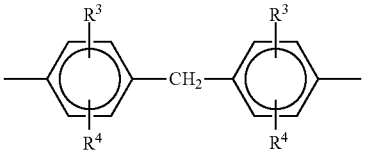
(r)

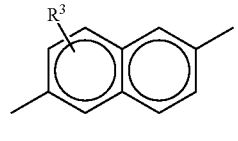
(s)

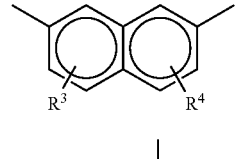
(t)

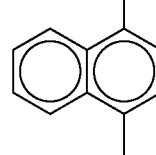
(u)

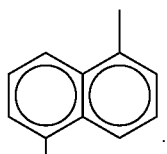
(v)

In the above formulae, $R^3$ and $R^4$, which are the same or different, each represent a substituent selected from hydrogen, a $C_{1-12}$ alkyl group, a $C_{1-12}$ alkoxy group, a $C_{6-24}$ aryl group, and a halogen group.

Examples of the structure contained in the polyarylene sulfide copolymer as a copolymeric component include structures containing an aromatic ring(s), preferably the structures represented by formulae (a) to (j), more preferably the structures represented by formulae (a) to (e), (i) and (j):

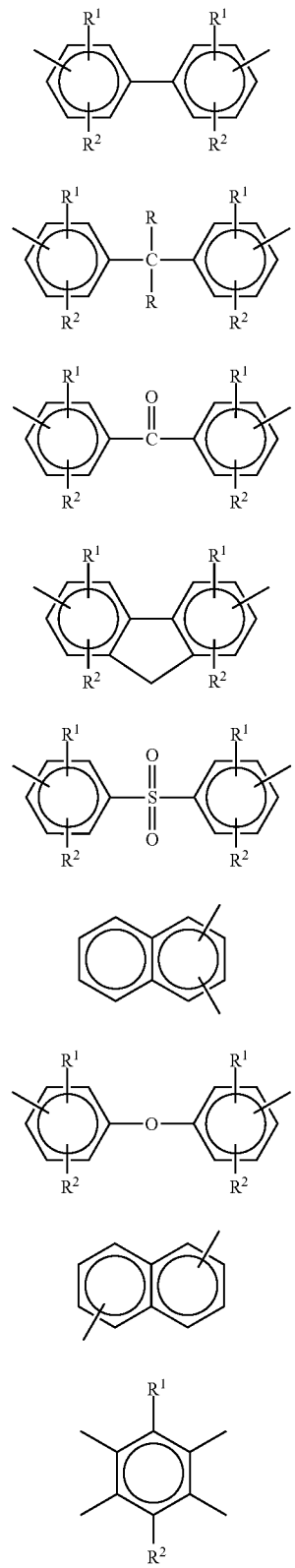

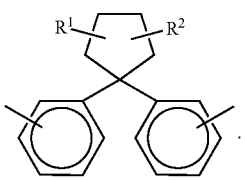

In the above formulae, R, $R^1$ and $R^2$, which are the same or different, each represent a substituent selected from hydrogen, a $C_{1-12}$ alkyl group, a $C_{6-24}$ aryl group, and a halogen group.

Arylene sulfide units represented as repeating units —(Ar—S)— and copolymeric components in the polyarylene sulfide copolymer may be linked via a structure other than the repeating units, or directly via terminal groups derived from the repeating units. Preferred examples of linking groups include any one selected from a sulfide group, a sulfonyl group, a sulfinyl group, an ester group, an amide group, an imide group, an ether group, a urea group, a urethane group, and a siloxane group. More preferably, those in which arylene sulfide units comprising repeating units —(Ar—S)— and copolymeric components are linked via an imide group exhibit higher rigidity at high temperature. The content of the linking group with respect to the sulfur atom in the polyarylene sulfide copolymer is preferably 1 mol % or more, more preferably 2 mol % or more, still more preferably 4 mol % or more. Further, the content is preferably 30 mol % or less, more preferably 40 mol % or less. The content of the linking group is twice the content of the copolymeric component described below, and can be determined by calculation.

The content of the copolymeric component contained as a structural unit in the poly-arylene sulfide copolymer with respect to the sulfur atom in the polyarylene sulfide copolymer is preferably 0.5 mol % or more, more preferably 1 mol % or more, still more preferably 2 mol % or more. Preferably, the content within the range as described above tends to prevent the decrease in rigidity under high temperature conditions. Further, the content is preferably 30 mol % or less, more preferably 20 mol % or less, still more preferably 15 mol % or less. Preferably, the content within the range as described above tends to provide high chemical resistance.

The type and content of the copolymeric component contained as a structural unit in the polyarylene sulfide copolymer can be assessed, for example, by the absorption of the functional group of the copolymeric component in the FT-IR spectrum.

The polyarylene sulfide copolymer has a glass transition temperature of 95° C. or higher and 190° C. or lower, preferably 100° C. or higher and 180° C. or lower, more preferably 110° C. or higher and 160° C. or lower. When the glass transition temperature is lower than 95° C., the decrease in rigidity under high temperature conditions is not sufficiently prevented, and when higher than 190° C. the chemical resistance of the molded product tends to decrease, both examples being problematic. The term "glass transition temperature" as used herein is defined as a flexion point of the baseline shift detected using a differential scanning calorimeter during a temperature rise from 0° C. to 340° C. at a rate of 20° C./min. The glass transition temperature can be improved by introducing a rigid structure into the backbone structure of the polyarylene sulfide copolymer, the rigid structure including those represented by formulae (a) to (j) described above. In addition, the polyarylene sulfide copolymer has a melting point of 300° C. or lower, or does not have a melting point. Having a melting point of 300° C. or lower or no melting point enables easy melt-molding processing. The lower limit of the melting point is not particularly specified, but preferably 200° C. or higher, for example, 220° C. or higher, from the viewpoint of heat resistance. The term "melting point" refers to a melting peak temperature value detected with a differential scanning calorimeter when the temperature is elevated from 0° C. to 340° C. at a rate of 20° C./min, held at 340° C. for 1 minute, cooled down to 100° C. at a rate of 20° C./min, held at 100° C. for 1 minute, and again elevated to 340° C. at a rate of 20° C./min. The term "no melting point" is defined as absence of a clear melting peak when measured using a differential scanning calorimeter under the conditions described above. The melting point can be adjusted by selecting the molecular weight of the arylene sulfide unit in the polyarylene sulfide copolymer.

A preferred molecular weight of the polyarylene sulfide copolymer, in terms of weight average molecular weight, is 10,000 or more, preferably 20,000 or more, more preferably 30,000 or more, still more preferably 40,000 or more, still even more preferably 45,000 or more. Preferably, a weight average molecular weight of 10,000 or more tends to allow the polyarylene sulfide copolymer to have sufficiently high toughness and mechanical strength. The upper limit of the weight average molecular weight is not particularly specified; however, it is, for example, preferably less than 1,000,000, more preferably less than 500,000, still more preferably less than 200,000. In this range, the resulting product preferably has an excellent moldability.

The lower limit of the molecular weight (number average molecular weight) of the arylene sulfide unit in the polyarylene sulfide copolymer is 1,000 or more, preferably 1,500 or more, more preferably 2,000 or more. When the molecular weight of the arylene sulfide unit in the copolymer is less than 1,000, the polyarylene sulfide copolymer does not have sufficient chemical resistance. The upper limit of the molecular weight (number average molecular weight) of the arylene sulfide unit in the polyarylene sulfide copolymer is 10,000 or less, preferably 6,000 or less, more preferably 4,000 or less. When the number average molecular weight of the arylene sulfide unit is over 10,000, the reactivity with the copolymeric component may be reduced. The molecular weight (number average molecular weight) of the arylene sulfide unit in the polyarylene sulfide copolymer can be determined by treating the polyarylene sulfide copolymer with 10% aqueous sodium hydroxide solution under reflux conditions for 5 hours and measuring the molecular weight of the residue.

To make the molecular weight of the arylene sulfide unit in the polyarylene sulfide copolymer fall within the above range, an (A) arylene sulfide prepolymer having a number average molecular weight (Mn) of 1,000 or more and 10,000 or less described later is preferably used in manufacturing the polyarylene sulfide copolymer.

The above-described weight average molecular weight and number average molecular weight can be determined, for example, by SEC (size exclusion chromatography) comprising a differential refractive index detector.

The polyarylene sulfide copolymer can prevent the decrease in rigidity under high temperature conditions. The degree of rigidity reduction under high temperature conditions can be evaluated by $T_{90}$, which is calculated, for example, by determining the temperature dependence of the storage modulus using a viscoelasticity measuring device. A higher value of $T_{90}$ can be said to prevent the decrease in rigidity at high temperature. The term "$T_{90}$" means a temperature at which the storage modulus is 90% of that at 50° C. when the storage modulus is measured using a viscoelasticity measuring device while rising the temperature from 50° C. to 250° C. at a temperature rising rate of 2° C./min. The $T_{90}$ value can be improved by introducing a rigid structure into the backbone structure of the polyarylene sulfide copolymer, the rigid structure including those represented by formulae (a) to (j) described above. The $T_{90}$ value is preferably 90° C. or higher, preferably 100° C. or higher, preferably 110° C. or higher. A $T_{90}$ of 90° C. or higher is preferable from the viewpoint of preventing a decrease in rigidity when used under high temperature conditions. The upper limit of $T_{90}$ is any value, for example, preferably 190° C. or lower.

(A) Arylene Sulfide Prepolymer

The lower limit of the molecular weight (number average molecular weight) of the (A) arylene sulfide prepolymer may be 1,000 or more, preferably 1,500 or more. Preferably, a molecular weight of the arylene sulfide prepolymer exceeding the above range provides the polyarylene sulfide copolymer with sufficient chemical resistance. The upper limit of the molecular weight (number average molecular weight) of the arylene sulfide prepolymer is 10,000 or less, preferably 6,000 or less, more preferably 4,000 or less. Preferably, a number average molecular weight of the arylene sulfide prepolymer of 10,000 or less enables sufficient introduction of the copolymeric component into the backbone structure and sufficient prevention of the decrease in rigidity at high temperatures.

Further, the (A) arylene sulfide prepolymer preferably has a reactive functional group, more preferably at least one functional group selected from a hydroxyl group, a carboxyl group, a silanol group, a sulfonic group, an amino group, an acid anhydride group, an acetamide group, a sulfonamide group, a cyano group, an isocyanate group, an aldehyde group, an acetyl group, an epoxy group, and an alkoxy silane group, in particular, an amino group and/or an acid anhydride group. Introduction of the functional group into the arylene sulfide prepolymer can be assessed by the absorption from the functional group in FT-IR. The functional group may bind to the arylene sulfide prepolymer at any position as long as the functional group can react with a copolymeric component described later, and is preferably contained at the end of the arylene sulfide prepolymer as a terminal group from the viewpoint of improvement of the chemical resistance of the polyarylene sulfide copolymer.

Examples of the method of producing such a preferred (A) arylene sulfide prepolymer include: (A1) a method comprising heating a mixture containing at least a sulfurizing agent, a dihalogenated aromatic compound, an organic polar solvent, and a monohalogenated compound having a reactive functional group; (A2) (a) a method comprising heating a cyclic polyphenylene sulfide in the presence of a sulfide compound having a reactive functional group; (A3) a method comprising heating mixture containing at least polyphenylene sulfide, an organic polar solvent, and a sulfurizing agent to allow them to react, then adding a monohalogenated compound having a reactive functional group to the obtained reaction mixture, and heating the mixture; and (A4) a method comprising adding a sulfide compound having a reactive functional group to polyphenylene sulfide and heating the mixture.

Now, the method of producing an (A) arylene sulfide prepolymer for use in synthesis of the block copolymer will be described in detail below. First, raw materials for use in production of the (A) arylene sulfide prepolymer will be described.

Sulfurizing Agent

The sulfurizing agent for use in synthesis of the (A) arylene sulfide prepolymer may be any one capable of introducing sulfide bonds into dihalogenated aromatic compounds, including alkali metal sulfide, alkali metal hydrosulfide, and hydrogen sulfide.

Specific examples of the alkali metal sulfide include lithium sulfide, sodium sulfide, potassium sulfide, rubidium sulfide, cesium sulfide and mixtures of two or more of these, among which preferably used are lithium sulfide and/or sodium sulfide, more preferably sodium sulfide. These alkali metal sulfides can be used as hydrates or aqueous mixtures, or as anhydride. The term "aqueous mixture" refers to an aqueous solution, or a mixture of an aqueous solution and a solid component, or a mixture of water and a solid component. Commonly available inexpensive alkali metal sulfides are hydrates or aqueous mixtures, and thus alkali metal sulfides in such forms are preferably used.

Specific examples of the alkali metal hydrosulfide include lithium hydrosulfide, sodium hydrosulfide, potassium hydrosulfide, rubidium hydrosulfide, cesium hydrosulfide, and mixtures of two or more of these, among which preferably used are lithium hydrosulfide and/or sodium hydrosulfide, more preferably sodium hydrosulfide.

Alkali metal sulfides prepared from alkali metal hydrosulfides and alkali metal hydroxides in the reaction system can also be used. Alternatively, alkali metal sulfides prepared by contacting alkali metal hydrosulfides and alkali metal hydroxides in advance can be used. The alkali metal hydrosulfides and alkali metal hydroxides can be used as hydrates or aqueous mixtures, or in a form of anhydride, among which hydrates or aqueous mixtures are preferable from the viewpoint of availability and cost.

Alkali metal sulfides prepared from an alkali metal hydroxide such as lithium hydroxide or sodium hydroxide and a hydrogen sulfide in the reaction system can also be used. Alternatively, alkali metal sulfides prepared by contacting an alkali metal hydroxide such as lithium hydroxide or sodium hydroxide and a hydrogen sulfide in advance can be used. The hydrogen sulfide may be used in a gaseous state, liquid state, or aqueous solution state.

Alkaline metal hydroxides and/or alkaline earth metal hydroxides can be used together with the sulfurizing agent. Specific and preferred examples of the alkali metal hydroxides include sodium hydroxide, potassium hydroxide, lithium hydroxide, rubidium hydroxide, cesium hydroxide, and mixtures of two or more of these. Specific examples of the alkaline earth metal hydroxides include calcium hydroxide, strontium hydroxide, and barium hydroxide, among which preferably used is sodium hydroxide.

When alkali metal hydrosulfides are used as the sulfurizing agent, alkali metal hydroxides are particularly preferably used together, whose amount used per mole of alkali metal hydrosulfide is preferably 0.95 mol or more, more preferably 1.00 mol or more, still more preferably 1.005 mol or more. The upper limit is preferably 1.50 mol or less, more preferably 1.25 mol or less, still more preferably 1.20 mol or less. When hydrogen sulfides are used as the sulfurizing agent, alkali metal hydroxides are particularly preferably used together, whose amount used per mole of hydrogen sulfide is preferably 2.00 mol or more, more preferably 2.01 mol or more, still more preferably 2.04 mol or more. The upper limit is preferably 3.00 mol or less, more preferably 2.50 mol or less, still more preferably 2.40 mol or less.

Dihalogenated Aromatic Compound

Examples of the dihalogenated aromatic compound for use in synthesis of the (A) arylene sulfide prepolymer include dihalogenated benzenes such as p-dichlorobenzene, o-dichlorobenzene, m-dichlorobenzene, p-dibromobenzene, o-dibromobenzene, m-dibromobenzene, 1-bromo-4-chlorobenzene, and 1-bromo-3-chlorobenzene, and dihalogenated aromatic compounds having a substituent other than halogen such as 1-methoxy-2,5-dichlorobenzene, 1-methyl-2,5-dichlorobenzene, 1,4-dimethyl-2,5-dichlorobenzene, 1,3-dimethyl-2,5-dichlorobenzene, 2,5-dichlorobenzoic acid, 3,5-dichlorobenzoic acid, 2,5-dichloroaniline, and 3,5-dichloroaniline. In particular, halogenated aromatic compounds containing p-dihalogenated benzene as its main component represented by p-dichlorobenzene are preferable. Particularly preferable are those containing 80 to 100 mol % of p-dichlorobenzene, and more preferably those containing 90 to 100 mol % of p-dichlorobenzene. In addition, two or more different dihalogenated aromatic compounds may be used in combination.

Organic Polar Solvent

Preferred examples of the organic polar solvent for use in synthesis of the (A) arylene sulfide prepolymer include organic amide solvents. Specific examples of the organic amide solvents that are preferably used include N-alkylpyrrolidones such as N-methyl-2-pyrrolidone, N-ethyl-2-pyrrolidone, and N-cyclohexyl-2-pyrrolidone, caprolactams such as N-methyl-c-caprolactam, aprotic organic solvents represented by, for example, 1,3-dimethyl-2-imidazolidinone, N, N-dimethylacetamide, N, N-dimethylformamide, and hexamethylphosphoramide, and mixtures thereof because of their high reaction stability. Of these, preferably used are N-methyl-2-pyrrolidone and 1,3-dimethyl-2-imidazolidinone, and more preferably used is N-methyl-2-pyrrolidone.

Monohalogenated Compound

The monohalogenated compound for use in synthesis of the (A) arylene sulfide prepolymer may be any monohalogenated compound having a reactive functional group W represented by formula (I), preferably those having as the reactive functional group W a functional group selected from a hydroxyl group, a carboxyl group, a silanol group, a sulfonic group, an amino group, an acid anhydride group, an acetamide group, a sulfonamide group, a cyano group, an isocyanate group, an aldehyde group, an acetyl group, an epoxy group, and an alkoxy silane group, particularly preferably those having an amino group or an acid anhydride group. When being selected from these functional groups, the functional group tends to be efficiently introduced into the (A) arylene sulfide prepolymer.

(I)

In formula (I), V represents halogen.

Specific examples of such a monohalogenated compound include monohalogenated compounds such as 2-chlorobenzoic acid, 3-chlorobenzoic acid, 4-chlorobenzoic acid, 2-amino-4-chlorobenzoic acid, 4-chloro-3-nitrobenzoic acid, 4-chlorobenzophenone-2-carboxylic acid, 2-chloroaniline, 3-chloro aniline, 4-chloro aniline, 2-chlorophenol, 3-chlorophenol, 4-chlorophenol, 3-chlorophthalic acid, and 4-chlorophthalic acid. Of these, preferably used are 3-chlorophthalic acid, 4-chlorophthalic acid, 2-chloroaniline, 3-chloroaniline, and 4-chloroaniline from the viewpoint of, for example, reactivity during polymerization and versatility. These monohalogenated compounds may be used alone or in combination of two or more.

(a) Cyclic Polyphenylene Sulfide

The (a) cyclic polyphenylene sulfide for use in synthesis of the (A) arylene sulfide prepolymer is a monomeric cyclic compound as shown in formula (II) or a mixture thereof, containing a repeating unit represented by the formula -(Ph-S)— as a main constituent unit, preferably containing 80 mol % or more of the repeating unit, and preferably containing at least 50% by weight or more of cyclic compound formula (II), more preferably 70% by weight or more, still more preferably 80% by weight or more, particularly preferably 90% by weight or more:

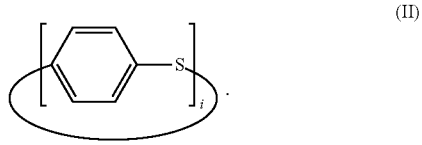

(II)

The upper limit of the amount of the cyclic compound of formula (II) contained in the (a) cyclic polyphenylene sulfide is any value, preferably 98% by weight or less, more preferably 95% by weight or less. In general, the higher the weight fraction of the cyclic compound of formula (II) in the (a) cyclic polyphenylene sulfide, the higher the molecular weight of the polyphenylene sulfide obtained after heating. When the weight fraction of the cyclic polyphenylene sulfide in the (a) cyclic polyphenylene sulfide is within the preferred range, the melting temperature will not be excessively high.

The number of repeating units i in formula (II) may be any number, preferably i=4 to 50, more preferably i=4 to 25, still more preferably i=4 to 15. As described later, heating a (a) cyclic polyphenylene sulfide to convert it to an (A) arylene sulfide prepolymer is preferably carried out at a temperature not lower than the melting point of the (a) cyclic polyphenylene sulfide. Since the melting point of a (a) cyclic polyphenylene sulfide tends to increase as the number of repeating units i increases, it is advantageous that the number of repeating units i is within the above range from the viewpoint of possibility to convert a (a) cyclic polyphenylene sulfide to an (A) arylene sulfide prepolymer at a lower temperature.

The (a) cyclic polyphenylene sulfide may either be a single compound having a single number of repeating units or a mixture of cyclic compounds having different numbers of repeating units. However, a mixture of cyclic compounds having different numbers of repeating units is tends to have a lower melting point than that of a single compound having a single number of repeating units. A mixture of cyclic compounds having different numbers of repeating units is preferably used because the temperature at which conversion to an (A) arylene sulfide prepolymer occurs can be lowered.

Components other than the cyclic compound contained in the (a) cyclic polyphenylene sulfide are preferably polyphenylene sulfide oligomers. The term "polyphenylene sulfide oligomer" as used herein refers to a linear homooligomer or a co-oligomer containing a repeating unit represented by the formula -(Ph-S)— as a main constituent unit, preferably containing 80 mol % or more of the repeating unit. For example, the polyphenylene sulfide oligomer can have a molecular weight lower than that of polyphenylene sulfide, specifically and preferably having a number average molecular weight of less than 5,000.

Sulfide Compound

The sulfide compound for use in synthesis of the (A) arylene sulfide prepolymer is a sulfide compound having a reactive functional group represented by general formula (III) (hereinafter, may be abbreviated as sulfide compound (III)):

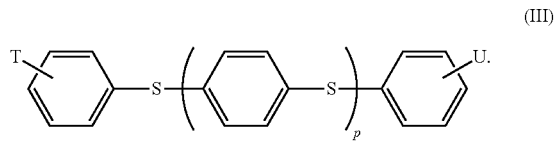

(III)

In the formula (III), at least one of T and U is a reactive functional group selected from an amino group, a carboxyl group, a hydroxyl group, an acid anhydride group, an isocyanate group, an epoxy group, a silanol group, an alkoxy silane group and derivatives thereof, preferably a reactive functional group selected from an amino group and an acid anhydride group. The number of repeating units p in the sulfide compound represents an integer from 0 to 20, and p may be a single integer, or a combination of different integers. Preferably p is an integer from 0 to 15, more preferably from 0 to 10. When the number of repeating units p is within the above preferred range, the solubility with polyphenylene sulfide and the low viscosity characteristics will not be impaired.

Examples of such a sulfide compound include 2,2'-thiodianiline, 3,3'-thiodianiline, 4,4'-thiodianiline, bis(2-carboxyphenyl) sulfide, bis(3-carboxyphenyl) sulfide, bis(4-carboxyphenyl) sulfide, bis(2-hydroxyphenyl) sulfide, bis(3-hydroxyphenyl) sulfide, bis(4-hydroxyphenyl) sulfide, bis (4-hydroxy-3-methylphenyl) sulfide, 5,5'-thiodisalicylic acid, 2,2',4,4'-tetrahydroxydiphenyl sulfide, and 3,3',4,4'-thiodiphthalic dianhydride, as well as oligomers thereof. Of these, preferably used are 4,4'-thiodianiline, 3,3',4,4'-thiodiphthalic dianhydride, and oligomers thereof from the viewpoint of reactivity and crystallizability. These sulfide compounds may be used alone or in combination of two or more.

Method of Producing an (A) Arylene Sulfide Prepolymer

Next, preferred methods of producing an (A) arylene sulfide prepolymer will be described in detail.

Method of producing an (A) arylene sulfide prepolymer: A1

Preferred methods of producing the (A) arylene sulfide prepolymer include a method comprising heating a mixture containing at least a sulfurizing agent, a dihalogenated aromatic compound, an organic polar solvent, and a monohalogenated compound having a reactive functional group.

The amount of the dihalogenated aromatic compound used in the present production method is preferably 0.80 mol or more, more preferably 0.90 mol or more, still more preferably 0.95 mol or more, per mole of the sulfurizing agent to reduce degradation and efficiently produce polyphenylene sulfide having a viscosity suitable for processing. The upper limit is preferably less than 1.50 mol, more preferably less than 1.10 mol, still more preferably less than 1.05 mol. When the amount used is 0.80 mol or more per mole of the sulfurizing agent, degradation does not tend to occur. When the amount used is less than 1.50 mol, absence of manifestation of mechanical properties due to its decreased molecular weight can be prevented.

In the production method, although the amount of an organic polar solvent used as a polymerization solvent for the (A) arylene sulfide prepolymer is not particularly limited, from the viewpoint of stable reactivity and economy, preferably 2.5 mol or more, and preferably less than 5.5 mol as the upper limit, more preferably less than 5.0 mol, still more preferably less than 4.5 mol, per mole of the sulfurizing agent.

In addition, the production method comprises adding a monohalogenated compound having a reactive functional group in combination with the dihalogenated aromatic compound. The amount of the monohalogenated compound used is preferably 0.01 mol % or more per mole of the dihalogenated aromatic compound. The upper limit is preferably 25 mol % or less, more preferably 18 mol % or less, still more preferably 15 mol % or less. When the amount of the monohalogenated compound used is 0.01 mol % or more, reactive ends can be sufficiently introduced into the obtained (A) arylene sulfide prepolymer. On the other hand, when the amount is 25 mol % or less, the molecular weight of the (A) arylene sulfide prepolymer does not decrease, and there is no disadvantage such as increase in the cost of raw materials.

The total amount of halogenated compounds such as dihalogenated aromatic compounds and monohalogenated compounds is preferably within a specific range. The total amount of halogenated compounds per mole of the sulfurizing agent is preferably 0.98 mol or more, more preferably 1.00 mol or more, still more preferably 1.03 mol or more. On the other hand, the upper limit of the total amount of halogenated compounds per mole of the sulfurizing agent is preferably less than 1.10 mol, more preferably less than 1.08 mol, still more preferably less than 1.07 mol. When the total amount of halogenated compounds is 0.98 mol or more per mole of the sulfurizing agent, degradation does not tend to occur. When the total amount is less than 1.10 mol, absence of manifestation of mechanical properties due to decreased molecular weight will not occur.

When the (A) arylene sulfide prepolymer is produced according to the production method, the monohalogenated compound may be added at any timing, and may be added during the dehydration step, at the start of polymerization, or in the middle of polymerization described later. Further, the monohalogenated compound may be added separately in multiple steps. The timing of adding the monohalogenated compound is preferably at a time when the conversion ratio of the dihalogenated aromatic compound is less than 80%, more preferably less than 70%, most preferably between the completion of the dehydration step and the start of polymerization, or at the start of polymerization, i.e., at the same time as the dihalogenated aromatic compound. When the monohalogenated compound is added at the preferred timing, there is no need for a reflux device to prevent the monohalogenated compound from volatilizing, an injection device or the like, and the monohalogenated compound does not remain in the polymerization system without completion of consumption at the end of the polymerization.

The sulfurizing agent can be used in a form of a hydrate or an aqueous mixture. In this example, a dehydration step is preferably carried out comprising heating a mixture containing an organic polar solvent and a sulfurizing agent to remove excess amounts of water from the system before adding a dihalogenated aromatic compound or a monohalogenated compound. This dehydration step may be performed by any method, including a method comprising adding an alkali metal hydro sulfide and an alkali metal hydroxide to an organic polar solvent desirably under an inert gas atmosphere at a temperature ranging from room temperature to 150° C., preferably from room temperature to 100° C., and heating the mixture to at least 150° C. or higher, preferably 180 to 260° C. under normal or reduced pressure to evaporate off water. Preferably, the amount of water in the system after completion of the dehydration step is from 0.9 to 1.1 mol per mole of the sulfurizing agent added. The term "the amount of water in the system" means an amount obtained by subtracting the amount of water removed from the system from the amount of water added during the dehydration step.

The method of producing an (A) arylene sulfide prepolymer performs a polymerization step comprising contacting the reaction product prepared in the dehydration step described above with a dihalogenated aromatic compound and/or a monohalogenated compound in an organic polar solvent to polymerize them. At the start of the polymerization step, a sulfurizing agent and a dihalogenated aromatic compound are added to an organic polar solvent desirably under an inert gas atmosphere, at a temperature ranging from 100° C. or higher, preferably 130° C. or higher, to 220° C. or lower, preferably 200° C. or lower as the upper limit. These materials may be added in any order or at the same time.

The polymerization reaction is performed within a temperature range from 200° C. or higher to lower than 280° C., and may be under any polymerization conditions as long as the desired effect is achieved. For example, a method comprising heating the mixture at a certain rate and then continuing the reaction at a temperature of 245° C. or higher and lower than 280° C. for a certain period of time; a method comprising performing the reaction at a certain temperature of 200° C. or higher and lower than 245° C. for a certain period of time, heating the reaction to a temperature of 245° C. or higher and lower than 280° C., and continuing the reaction for a certain period of time; and a method comprising performing the reaction at a certain temperature of 200° C. or higher and lower than 245° C., in particular 230° C. or higher and lower than 245° C., for a certain period of time, heating the reaction to a temperature of 245° C. or higher and lower than 280° C., and completing the reaction in a short period of time may be used.

The polymerization reaction described above is performed desirably under a non-oxidizing atmosphere, preferably under an inert gas atmosphere such as nitrogen, helium, or argon, particularly preferably under a nitrogen atmosphere from the viewpoint of economy and ease of handling. In addition, the polymerization reaction may be performed under any pressure, which depends on, for example, the types and amounts of the materials and solvents used, or the polymerization reaction temperature and thus cannot be generally specified.

In the method of producing a polyarylene sulfide copolymer, an (A) arylene sulfide prepolymer is collected from the polymerization reaction products obtained by the method described above and used in the copolymerization reaction. The polymerization reaction products contain an (A) arylene sulfide prepolymer and an organic polar solvent, and may contain other components such as unreacted materials, water, and by-product salts. The (A) arylene sulfide prepolymer may be collected from such polymerization reaction products by any method, including a method comprising: removing, as necessary, part or most of the organic polar solvent by distillation or other operation; then contacting the residual materials with a solvent having low solubility with the (A) arylene sulfide prepolymer component, and miscible with the organic polar solvent, and soluble with by-product salts, as necessary, under heating; and collecting the (A) arylene sulfide prepolymer as a solid. In general, solvents having such characteristics are relatively polar solvents. The preferred solvent may vary depending on the types of the organic polar solvent used and the by-product salts without limitation. Examples of the solvent include water, alcohols represented by methanol, ethanol, propanol, isopropanol, butanol, and hexanol, ketones represented by acetone and methyl ethyl ketone, acetate esters represented by ethyl acetate and butyl acetate, preferably water, methanol, and acetone, particularly preferably water from the viewpoint of availability and economy.

Treatment with such solvents can reduce the amounts of organic polar solvents and by-product salts contained in the (A) arylene sulfide prepolymer. This treatment makes the (A) arylene sulfide prepolymer precipitated as a solid component that can be recovered by a known solid-liquid separation method. Examples of the solid-liquid separation method include filtration, centrifugation, and decantation. This series of treatments can be repeated several times as necessary, which tends to further reduce the amounts of organic polar solvents and by-product salt contained in the (A) arylene sulfide prepolymer.

The method of treatment with the solvent described above includes a method comprising mixing the solvent and the polymerization reaction products that can comprise stirring or heating as necessary. Treatment with the solvent can be performed at any temperature, preferably from 20 to 220° C., more preferably from 50 to 200° C. Such a range is preferable because, for example, it facilitates the removal of by-product salts and enables treatment under relatively low pressure. When water is used as the solvent, the water is preferably distilled water or deionized water. Aqueous solution can also be used containing, as necessary, organic acidic compounds such as formic acid, acetic acid, propionic acid, butyric acid, chloroacetic acid, dichloroacetic acid, acrylic acid, crotonic acid, benzoic acid, salicylic acid, oxalic acid, malonic acid, succinic acid, phthalic acid, and fumaric acid, as well as alkali metal and alkaline earth metal salts thereof; inorganic acidic compounds such as sulfuric acid, phosphoric acid, hydrochloric acid, carbonic acid, and silicic acid; and ammonium ion. When the (A) arylene sulfide prepolymer obtained by the treatment contains the solvent used in the treatment, drying can be performed, as necessary, to remove the solvent.

Method of Producing an (A) Arylene Sulfide Prepolymer: A2

Preferred methods of producing the (A) arylene sulfide prepolymer include a method comprising heating a (a) cyclic polyphenylene sulfide in the presence of a sulfide compound (III). According to this method, an (A) arylene sulfide prepolymer having the properties described above can be easily obtained.

In the method of producing the (A) arylene sulfide prepolymer (A2), the amount of the sulfide compound (III) is preferably 0.01 mol % or more per mole of sulfur atoms in the (a) cyclic polyphenylene sulfide. In addition, the upper limit is preferably 25 mol % or less, more preferably 15 mol % or less, still more preferably 10 mol % or less, particularly preferably 5 mol % or less. When the amount of the sulfide compound (III) is 0.01 mol % or more, the (A) arylene sulfide prepolymer to be obtained will have sufficient reactive functional groups introduced. When the amount is 25 mol % or less, the (A) arylene sulfide prepolymer to be obtained do not have low molecular weight, as well as without disadvantages such as increase in material cost.

When producing the (A) arylene sulfide prepolymer by the production method (A2), the preferred heating temperature is that at which a reaction mixture containing a (a) cyclic polyphenylene sulfide and a sulfide compound (III) having a reactive functional group is melt. Any temperature can be employed as long as it is under such temperature conditions. A heating temperature higher than the melting temperature of the (a) cyclic polyphenylene sulfide is preferably without requiring an excessively long time to obtain the (A) arylene sulfide prepolymer. The melting temperature of the (a) cyclic polyphenylene sulfide cannot be uniquely indicated because it varies depending on the composition and molecular weight of the (a) cyclic polyphenylene sulfide and the environment during heating. However, the melting temperature can be determined, for example, by analyzing the (a) cyclic polyphenylene sulfide with a differential scanning calorimeter. The lower limit of the heating temperature includes, for example, 180° C. or higher, preferably 200° C. or higher, more preferably 220° C. or higher, still more preferably 240° C. or higher. In this temperature range, the (a) cyclic polyphenylene sulfide is melt, and thus the (A) arylene sulfide prepolymer can be obtained in a short time. The upper limit of the heating temperature includes, for example, 400° C. or lower, preferably 360° C. or lower, more preferably 340° C. or lower. Below this temperature, adverse effects on properties of the obtained (A) arylene sulfide prepolymer due to undesirable side reactions tend to be prevented so that an (A) arylene sulfide prepolymer having the above-described characteristics can be obtained.

The reaction time cannot be uniquely specified because it varies depends on the conditions, including various characteristics such as the content, the number of repeating units i, and the molecular weight of the cyclic compound in the (a) cyclic polyphenylene sulfide used, the type of the sulfide compound used, and the heating temperature. However, the reaction time is preferably set so that the above-mentioned undesirable side reactions do not occur. Heating time is, for example, 0.01 hours or longer, preferably 0.05 hours or longer. The upper limit is, for example, 100 hours or shorter, preferably 20 hours or shorter, more preferably 10 hours or shorter.

The (a) cyclic polyphenylene sulfide can also be heated under conditions substantially without solvent. When performed under these conditions, heating can be made in a short time with high reaction rate so that the (A) arylene sulfide prepolymer tends to be easily obtained in a short time. The term "conditions substantially without solvent" refers to 10% by weight or less of the solvent in in the (a) cyclic polyphenylene sulfide, preferably 3% by weight or less.

The heating step described above can be performed not only in a manner using a usual polymerization reaction device, but also using any device equipped with a heating mechanism such as using an extruder or a melt kneader, including known processes such as batch process and continuous process.

Preferably, the heating step of the (a) cyclic polyphenylene sulfide is performed under a non-oxidizing atmosphere, and also preferably under reduced pressure conditions. When the heating step is performed under reduced pressure conditions, it is preferable to change the atmosphere in the reaction system to a non-oxidizing atmosphere and then to reduced pressure conditions. By this, undesirable side reactions such as crosslinking reactions and decomposition reactions, between cyclic polyphenylene sulfides, between polyphenylene sulfides generated by heating, and between polyphenylene sulfide and cyclic polyphenylene sulfide tends to be prevented from occurring. The term "a non-oxidizing atmosphere" as used herein refers to an atmosphere in which the gas phase with which the cyclic polyphenylene sulfide comes into contact has an oxygen concentration of 5% by volume or less, preferably 2% by volume or less, and more preferably substantially no oxygen, i.e., an inert gas atmosphere such as nitrogen, helium or argon, particularly preferably a nitrogen atmosphere from the viewpoint of economy and ease of handling. The term "under reduced pressure conditions" means that the reaction system is under a pressure lower than atmospheric pressure, and the upper limit is preferably 50 kPa or less, more preferably 20 kPa or less, still more preferably 10 kPa or less. The lower limit is, for example, 0.1 kPa or more, preferably 0.2 kPa or more. Under reduced pressure conditions above the preferred lower limit, cyclic compounds having low molecular weights contained in the cyclic polyphenylene sulfide is less likely to volatilize, while below the preferred upper limit, undesirable side reactions such as cross linking reaction are less likely to occur so that an (A) arylene sulfide prepolymer having the characteristics described above can be obtained. The (a) cyclic polyphenylene sulfide can also be heated under pressurized conditions. When the heating step is performed under pressurized conditions, it is preferable to change the atmosphere in the reaction system to a non-oxidizing atmosphere and then to pressurized conditions. The term "under pressurized conditions" means that the reaction system is under a pressure higher than atmospheric pressure, and the upper limit is not particularly restricted, but preferably 0.2 MPa or less from the viewpoint of ease of handling of the reaction device.

Method of Producing an (A) Arylene Sulfide Prepolymer: A3

Other preferred methods of producing an (A) arylene sulfide prepolymer include a method comprising heating a mixture containing at least polyphenylene sulfide, an organic polar solvent, and a sulfurizing agent; carrying out a reaction (A3-1); adding a monohalogenated compound having a reactive functional group to the obtained reaction mixture; and carrying out a reaction (A3-2). The reactions (A3-1) and (A3-2) will be described in detail below.

"Reaction (A3-1)"

The reaction (A3-1) comprises heating a mixture containing at least polyphenylene sulfide, an organic polar solvent, and a sulfurizing agent to allow the mixture to react.

Polyphenylene sulfide may be used in the reaction (A3-1) in any amount as long as the reaction mixture contains polyphenylene sulfide at the start of the reaction. For the ratio between polyphenylene sulfide and the sulfurizing agent, the amount of the sulfurizing agent per mole of a repeating unit represented by general formula (IV) that is a main constituent unit of polyphenylene sulfide is preferably less than 2 mol %, more preferably less than 1 mol %. For the ratio between polyphenylene sulfide and the sulfurizing agent, the lower limit of the amount of the sulfurizing agent is preferably 0.01 mol % or more, more preferably 0.1 mol % or more.

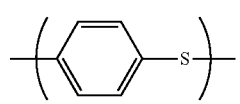

(IV)

Preferably, the ratio between polyphenylene sulfide and the sulfurizing agent is within such a range so that degradation of physical properties due to decreased molecular weight of the obtained (A) arylene sulfide prepolymer tends to be prevented and introduction of reactive functional groups into the (A) arylene sulfide prepolymer proceeds with high efficiency.

The organic polar solvent may be used in the reaction (A3-1) in any amount, preferably 2.5 mol or more per mole of sulfur atoms involved in the reaction in the reaction mixture from the viewpoint of stable reactivity and economy. The upper limit is preferably less than 50.0 mol, more preferably less than 10.0 mol, still more preferably less than 5.5 mol.

The reaction temperature of the reaction (A3-1) at which a mixture containing at least polyphenylene sulfide, an organic polar solvent, and a sulfurizing agent is heated and reacted cannot be uniquely specified because it varies with the types and amounts of polyphenylene sulfide, the organic polar solvent, and the sulfurizing agent used in the reaction. The lower limit is preferably 120° C. or higher, more preferably 150° C. or higher, still more preferably 200° C. or higher. The upper limit is preferably 280° C. or lower, more preferably 270° C. or lower, still more preferably 250° C. or lower. Such preferred temperature ranges tend to provide higher reaction rate. The reaction can be a single-step reaction at a constant temperature, a multi-step reaction in which the temperature is raised in stages, or a reaction in a manner in which the temperature is continuously changed.

The reaction time cannot be uniquely specified because it varies with the types and amounts of the materials used, or the reaction temperature, but is preferably 0.1 hours or longer, more preferably 0.5 hours or longer, still more preferably 1 hour or longer. When the reaction time is longer than the preferred time, unreacted material components tend to be sufficiently reduced. On the other hand, although the reaction time has no particular upper limit, the reaction sufficiently proceeds even when the reaction time is 40 hours or shorter. The reaction time can also be preferably 10 hours or shorter, more preferably 6 hours or shorter.

When at least polyphenylene sulfide and a sulfurizing agent are heated and reacted in an organic polar solvent, components that do not substantially inhibit the reaction or have an effect of accelerating the reaction can further be added in addition to the above-mentioned essential components. The reaction may be performed in any manner, preferably under stirring conditions. For the reaction (A3-1), various known polymerization methods and reaction methods such as batch process and continuous process can be employed. The reaction (A3-1) is performed desirably under a non-oxidizing atmosphere, preferably under an inert atmosphere such as nitrogen, helium, or argon. From the viewpoint of economy and ease of handling, the reaction is preferably performed under a nitrogen atmosphere.

In the reaction (A3-1), a dehydration step is also preferably performed to remove the excess amount of water from the system in the same manner as the method described in A1 above from the viewpoint of preventing decrease in the reaction rate.

A preferred molecular weight of polyphenylene sulfide used in the method (A3) of producing an (A) arylene sulfide prepolymer, in terms of weight average molecular weight, is 10,000 or more, preferably 20,000 or more, more preferably 30,000 or more, still more preferably 40,000 or more, still even more preferably 45,000 or more. Preferably, a weight average molecular weight of 10,000 or more tends to allow the obtained polyarylene sulfide copolymer to have sufficiently high toughness and mechanical strength. The upper limit of the weight average molecular weight may be any value, preferably less than 1,000,000, more preferably less than 500,000, still more preferably less than 200,000. In this range, the resulting product preferably is excellent in ease of handling when used in the method of producing an (A) arylene sulfide prepolymer (A3). The above-described weight average molecular weight and number average molecular weight can be determined, for example, by SEC (size exclusion chromatography) comprising a differential refractive index detector.

"Reaction (A3-2)"

In the reaction (A3-2), a monohalogenated compound having a reactive functional group is added to the reaction mixture obtained in the reaction (A3-1) and reacted.

The monohalogenated compound is added in any amount, preferably 1.0 mol or more, more preferably 2.0 mol or more, particularly preferably 2.5 mol or more per 1.0 mole of the sulfurizing agent used in the reaction (A3-1). The upper limit is preferably 10 mol or less, more preferably 5.0 mol or less, particularly preferably 4.5 mol or less. When the amount of the monohalogenated compound added is within such a preferred range, introduction of reactive functional groups is preferably progressed with high efficiency.

A preferred reaction temperature in the reaction (A3-2) cannot be uniquely specified because it varies depending on, for example, the types and amounts of components in the reaction mixture, and the molecular weight of polyphenylene sulfide contained in the reaction mixture obtained in the reaction (A3-1). In general, the reaction temperature is preferably 120° C. or higher, more preferably 150° C. or higher, still more preferably 200° C. or higher. On the other hand, the upper limit is preferably 280° C. or lower, more preferably 270° C. or lower, still more preferably 250° C. or lower. Such preferred temperature ranges tend to provide higher reaction rate. The reaction can be a single-step reaction at a constant temperature, a multi-step reaction in which the temperature is raised in stages, or a reaction in a manner in which the temperature is continuously changed.

A preferred reaction time in the reaction (A3-2) cannot be uniquely specified because it depends on the molecular weight of polyphenylene sulfide contained in the reaction mixture obtained in the reaction (A3-1), the types and amounts of other components in the reaction mixture, and the reaction temperature. For example, the reaction time is 0.05 hours or longer, preferably 0.1 hours or longer, more preferably 0.5 hours or longer, still more preferably 1 hour or longer. On the other hand, although the reaction time has no particular upper limit, the reaction sufficiently proceeds even when the reaction time is 10 hours or shorter. The reaction time can also be preferably 6 hours or shorter, more preferably 3 hours or shorter.

In the method of producing a polyarylene sulfide copolymer, an (A) arylene sulfide prepolymer to be used is recovered from the thus obtained polymerization reaction products. The method of recovering the (A) arylene sulfide prepolymer can be performed in the same manner as the method described in the section of the production method A1.

Method of Producing an (A) Arylene Sulfide Prepolymer: A4

Other preferred methods of producing an (A) arylene sulfide prepolymer include a method comprising adding a sulfide compound (III) to polyphenylene sulfide and heating the mixture. According to this method, an (A) arylene sulfide prepolymer having the properties described above can be easily obtained.

Preferred examples of polyphenylene sulfide for use in the method of producing an (A) arylene sulfide prepolymer (A4) include polyphenylene sulfides containing a p-phenylene sulfide unit represented by general formula (IV) as a main constituent unit of the polymer in an amount of 80 mol % or more, in particular, 90 mol % or more.

In the method of producing the (A) arylene sulfide prepolymer (A4), the amount of the sulfide compound (III) is preferably 0.01 mol % or more per mole of sulfur atoms in the polyphenylene sulfide. In addition, the upper limit is preferably 25 mol % or less, more preferably 15 mol % or less, still more preferably 10 mol % or less, particularly preferably 5 mol % or less. When the amount of the sulfide compound is 0.01 mol % or more, the (A) arylene sulfide prepolymer to be obtained will have sufficient reactive functional groups introduced. When the amount is 25 mol % or less, the (A) arylene sulfide prepolymer to be obtained do not have a too low molecular weight, as well as without disadvantages such as increase in material cost.

When producing the (A) arylene sulfide prepolymer by the production method (A4), the preferred heating temperature is that at which a reaction mixture containing a polyphenylene sulfide and a sulfide compound (III) is melt. Any temperature can be employed as long as it is under such temperature conditions. A heating temperature higher than the melting temperature of the polyphenylene sulfide is preferably without requiring an excessively long time to obtain the (A) arylene sulfide prepolymer. The melting temperature of the polyphenylene sulfide cannot be uniquely indicated because it varies with the composition and molecular weight of the polyphenylene sulfide and the environment during heating. However, the melting temperature can be determined, for example, by analyzing the polyphenylene sulfide with a differential scanning calorimeter. The lower limit of the heating temperature includes, for example, 180° C. or higher, preferably 200° C. or higher, more preferably 220° C. or higher, still more preferably 240° C. or higher. In this temperature range, the polyphenylene sulfide is melt, and thus the (A) arylene sulfide prepolymer can be obtained in a short time. The upper limit of the heating temperature includes, for example, 400° C. or lower, preferably 380° C. or lower, more preferably 360° C. or lower. Below this temperature, adverse effects on properties of the obtained (A) arylene sulfide prepolymer due to undesirable side reactions tend to be prevented so that an (A) arylene sulfide prepolymer having the above-described characteristics can be obtained.

The reaction time cannot be uniquely specified because it varies depending on the conditions, including various characteristics such as the molecular weight and the viscosity of the polyphenylene sulfide used, the type of the sulfide compound (III) used, and the heating temperature. However, the reaction time is preferably set so that the above-mentioned undesirable side reactions do not occur. Heating time is, for example, 0.01 hours or longer, preferably 0.05 hours or longer. The upper limit is, for example, 100 hours or shorter, preferably 20 hours or shorter, more preferably 10 hours or shorter.

The polyphenylene sulfide can also be heated under conditions substantially without solvent. When performed under these conditions, heating can be made in a short time with high reaction rate so that the (A) arylene sulfide prepolymer tends to be easily obtained in a short time. The term "conditions substantially without solvent" refers to 10% by weight or less of the solvent in the polyphenylene sulfide, preferably 3% by weight or less.

When producing an (A) arylene sulfide prepolymer by the production method (A4), various transition-metal compounds can be used as reaction accelerating catalysts, preferably metals of groups 8 to 11 and periods 4 to 6 of the periodic table. Examples of such metal species include nickel, palladium, platinum, iron, ruthenium, rhodium, copper, silver, and gold. Suitable examples of the transition-metal compounds include various complexes, specifically palladium acetate, palladium chloride, palladium bromide, palladium iodide, palladium sulfide, bis(dibenzylideneacetone)palladium, tris(dibenzylideneacetone)dipalladium, tetrakis(triphenylphosphine)palladium, bis(tri-t-butylphosphine)palladium, bis[1,2-bis(diphenylphosphino)ethane] palladium, bis(tricyclohexylphosphine)palladium, [P,P'-1,3-bis(di-i-propylphosphino)propane] [P-1,3-bis(di-i-propylphosphino)propane]palladium, 1,3-bis(2,6-di-i-propylphenyl)imidazole-2-ylidene (1,4-naphthoquinone) palladium dimer, 1,3-bis(2,4,6-trimethylphenyl)imidazole-2-ylidene (1,4-naphthoquinone) palladium dimer, bis(3,5,3', 5'-dimethoxydibenzylideneacetone)palladium, platinum chloride, platinum bromide, bis(tri-t-butylphosphine)platinum, tetrakis(triphenylphosphine)platinum, tetrakis(trifluorophosphine)platinum, ethylene bis(triphenyl-phosphine) platinum, platinum-2,4,6,8-tetramethyl-2,4,6,8-tetravinylcyclotetrasiloxane complex, nickel formate, nickel acetate, nickel chloride, nickel bromide, nickel iodide, nickel sulfide, tetrakis(triphenylphosphine)nickel, tetrakis (triphenylphosphite)nickel, bis(1,5-cyclooctadiene)nickel, bisacetylacetone nickel, iron acetate, iron chloride, iron bromide, iron iodide, triiron dodecacarbonyl, iron pentacarbonyl, rhodium acetate, rhodium chloride, rhodium bromide, tetrarhodium dodecacarbonyl, hexarhodium hexadecacarbonyl, ruthenium chloride, ruthenium bromide, triruthenium dodecacarbonyl, copper acetate, copper chloride, copper bromide, silver acetate, silver chloride, silver bromide, gold acetate, gold chloride, and gold bromide. These catalysts may be used alone, or in a form of mixture or in combination of two or more.

Pre-formed complexes may be added as the catalyst, or transition-metal compounds such as transition metal salts and ligand compounds may be added separately. Examples of the ligand include complexes of triphenylphosphine, tri-t-butylphosphine, dibenzylideneacetone, dimethoxydibenzylideneacetone, cyclooctadiene, and carbonyl.

The concentration of the polymerization catalyst used is 0.001 to 20 mol %, preferably 0.005 to 15 mol %, more preferably 0.01 to 10 mol % based on the sulfur atoms in the sulfide compound (III). When the concentration is 0.001 mol % or more, an effect of accelerating the reaction can be obtained, and when 20 mol % or less, polyarylene sulfide without degradation of properties due to foreign matter can be obtained.

When adding the catalyst, it may be directly added, and then is preferably uniformly dispersed. Examples of methods of uniformly dispersing catalysts include a method of mechanically dispersing catalysts. Specific examples of the method of mechanically dispersing catalysts include methods using grinder, stirrer, mixer, shaker, and mortar. When the catalyst is a solid when dispersed, the catalyst preferably has an average particle size of 1 mm or less to allow more uniform dispersion.

The heating step described above can be performed not only in a manner using a usual heating reaction device, but also using any device equipped with a heating mechanism such as using an extruder or a melt kneader, including known processes such as batch process and continuous process.

Preferably, the heating step of the polyphenylene sulfide is performed under a non-oxidizing atmosphere, and also preferably under reduced pressure conditions. When the heating step is performed under reduced pressure conditions, it is preferable to change the atmosphere in the reaction system to a non-oxidizing atmosphere and then to reduced pressure conditions. By this, undesirable side reactions such as crosslinking reactions and decomposition reactions, for example, between polyphenylene sulfides tends to be prevented from occurring. The term "a non-oxidizing atmosphere" as used herein refers to an atmosphere in which the gas phase with which the polyphenylene sulfide comes into contact has an oxygen concentration of 5% by volume or less, preferably 2% by volume or less, and more preferably substantially no oxygen, i.e., an inert gas atmosphere such as nitrogen, helium or argon, particularly preferably a nitrogen atmosphere from the viewpoint of economy and ease of handling. The term "under reduced pressure conditions" means that the reaction system is under a pressure lower than atmospheric pressure, and the upper limit is preferably 50 kPa or less, more preferably 20 kPa or less, still more preferably 10 kPa or less. The lower limit is, for example, 0.1 kPa or more, preferably 0.2 kPa or more. Under reduced pressure conditions above the preferred lower limit, loads from the reduced pressure is not applied on the reaction device more than necessary, while below the preferred upper limit, undesirable side reactions such as cross linking reaction are less likely to occur so that an (A) arylene sulfide prepolymer having the characteristics described above can be obtained. The polyphenylene sulfide can also be heated under pressurized conditions. When the heating step is performed under pressurized conditions, it is preferable to change the atmosphere in the reaction system to a non-oxidizing atmosphere and then to pressurized conditions. The term "under pressurized conditions" means that the reaction system is under a pressure higher than atmospheric pressure, and the upper limit is not particularly restricted, but preferably 0.2 MPa or less from the viewpoint of ease of handling of the reaction device. Any polyphenylene sulfide may be used here, preferably those similar to the one described in the production method A3 described above.

In a preferred example, after the heating step is performed under a non-oxidizing atmosphere, reduced pressure conditions are applied to remove an unreacted sulfide compound (III) that remains after the end of heating. The reduced pressure conditions are the same as the preferred reduced pressure conditions during the heating step described above. The lower limit of the time under the reduced pressure conditions is preferably 3 minutes or longer, more preferably 5 minutes or longer. The upper limit is preferably shorter than 2 hours, more preferably shorter than 1 hour. When the time under the reduced pressure conditions is above the preferred lower limit, the residual sulfide compound (III) can be sufficiently removed, and when below the upper limit, undesirable side reactions such as cross-linking reaction tend to be less likely to occur.

Compounds Constituting the Structural Unit of the Copolymer

The compounds constituting the structural unit of the copolymer are those constituting one of the structural units of the polyarylene sulfide copolymer. The compounds constituting the structural unit of the copolymer are those having within a single molecule two or more reactive functional groups that can be linked with the (A) arylene sulfide prepolymer by a reaction. In this example, the functional groups contained in the compounds constituting the structural unit of the copolymer may be the same or different, and preferably are the same from the viewpoint of the uniformity of the reaction. In addition, the compounds preferably contain aromatic rings in terms of chemical and physical stability.

More preferably, the compounds constituting the structural unit of the copolymer are (B) at least one or more compounds selected from formula (a') to (k') (hereinafter, which may be referred to as (B) compound):

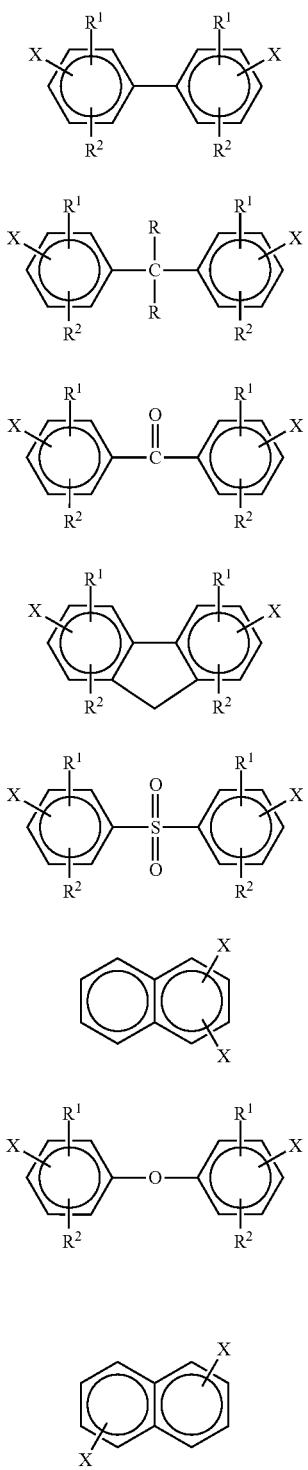

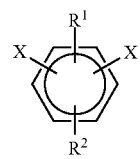

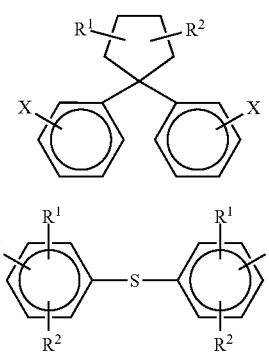

In the formulae, X is any one selected from a hydroxyl group, a carboxyl group, a silanol group, a sulfonic group, an amino group, an acid anhydride group, an acetamide group, a sulfonamide group, a cyano group, an isocyanate group, an aldehyde group, an acetyl group, an epoxy group, and an alkoxy silane group; preferably an amino group or an acid anhydride group from the viewpoint of the reactivity with the (A) arylene sulfide prepolymer. The aromatic ring in each compound represented by formulae (a') to (k') may be a bi- or tri-substituted product, and the two or more substituents X in a single substituted aromatic ring may be the same or different. R, $R^1$ and $R^2$, which are the same or different, each represent a substituent selected from hydrogen, a $C_{1-12}$ alkyl group, a $C_{6-24}$ aryl group, and a halogen group, preferably hydrogen, a methyl group, an ethyl group, or a propyl group in view of ease of availability.

Specific examples of the (B) compound include p-phenylenediamine, 4,4'-diaminodiphenylsulfide, 4,4'-diaminodiphenylsulphone, 4,4'-diaminobenzophenone, 4,4'-diaminodiphenylmethane, 4,4'-diaminodiphenylether, 2,7-diaminofluorene, o-toluidine, 1,5-diaminonaphthalene, p-benzenediol, 4,4'-dihydroxydiphenylsulfide, 4,4'-dihydroxydiphenylsulphone, 4,4'-dihydroxybenzophenone, 4,4'-dihydroxydiphenylmethane, 4,4'-dihydroxydiphenylether, 2,7-dihydroxyfluorene, 4,4'-dihydroxybiphenyl, 1,5-dihydroxynaphthalene, pyromellitic acid, 3,3',4,4'-thiodiphthalic acid, 3,3',4,4'-sulfonyldiphthalic acid, 3,3',4,4'-benzophenone-tetracarboxylic acid, 3,3',4,4'-sulfinyldiphthalic acid, 3,3',4,4'-biphenyltetracarboxylic dian-hydride, 3,3'4,4'-tetracarboxyldiphenylmethane dianhydride, 9, 9-bis(3, 4-dicarboxyphenyl)fluorene dianhydride, pyromellitic dianhydride, 3,3',4,4'-thiodiphthalic dianhydride, 3,3',4,4'-sulfonyldiphthalic dianhydride, 3,3',4,4'-benzophenonetetracarboxylic dianhydride, 3,3',4,4'-sulfinyldiphthalic dianhydride, 3,3',4,4'-biphenyltetracarboxylic dianhydride, 3,3',4,4'-tetra-carboxyldiphenylmethane dianhydride, 9,9-bis(3, 4-dicarboxyphenyl) fluorene dianhydride, 4,4'-thiodibenzoic acid, 4,4'-dicarboxylbenzophenone, 4,4'-sulfinyldibenzoic acid, and 4,4'-dicarboxylbiphenyl, preferably 4,4'-diaminodiphenylsulphone, 4,4'-diaminobenzophenone, 2,7-diaminofluorene, o-toluidine, 3,3',4,4'-thiodiphthalic dianhydride, 3,3', 4,4'-benzophenonetetra-carboxylic dianhydride, 3,3',4,4'-sulfinyldiphthalic dianhydride, 3,3',4,4'-biphenyltetracarboxylic dianhydride, 9,9-bis(3, 4-dicarboxyphenyl) fluorene dianhydride, 4,4'-thiodibenzoic acid, 4,4'-dicarboxylbenzophenone, 4,4'-sulfinyldibenzoic acid, 4,4'-dicarboxylbiphenyl from the viewpoint of reactivity.

Method of Producing Polyarylene Sulfide Copolymer

The polyarylene sulfide copolymer can be produced by mixing an (A) arylene sulfide prepolymer and a (B) compound and heating the mixture. The lower limit of the amount of the (B) compound added is preferably 0.5 mol % or more, more preferably 1 mol % or more, still more preferably 2 mol % or more with respect to sulfur atoms in the (A) arylene sulfide prepolymer. The upper limit is preferably 30 mol % or less, more preferably 20 mol % or less, still more preferably 15 mol % or less with respect to sulfur atoms in the (A) arylene sulfide prepolymer. When the amount added is above the lower limit described above, the decrease in rigidity of the obtained polyarylene sulfide copolymer at high temperature can be sufficiently prevented. As the amount of the (B) compound added increases, the obtained polyarylene sulfide copolymer tends to have reduced chemical resistance. When the amount of the (B) compound added is within the range described above, a polyarylene sulfide copolymer exhibiting sufficient mechanical properties and chemical resistance can be readily produced. The heating temperature to be selected is 200° C. or higher, preferably 230° C. or higher, more preferably 250° C. or higher. The upper limit of the heating temperature is, for example, 400° C. or lower, preferably 380° C. or lower, more preferably 360° C. or lower. When the heating temperature is 200° C. or higher, the reaction between the (A) arylene sulfide prepolymer and the (B) compound can be preferably easily accelerated. When the heating temperature is above the temperature at which the (A) arylene sulfide prepolymer melts, the reaction can be preferably finished in shorter time. The melting temperature of the (A) arylene sulfide prepolymer cannot be uniquely indicated because it varies depending on the composition and molecular weight of the (A) arylene sulfide prepolymer and the environment during heating. However, the melting temperature can be determined, for example, by analyzing the (A) arylene sulfide prepolymer with a differential scanning calorimeter. However, when the melting temperature is too high, undesirable side reactions, represented by cross-linking reactions and decomposition reactions between arylene sulfide prepolymers, tend to be likely to occur so that the obtained polyarylene sulfide copolymer may have degraded properties. Thus, it is desirable to avoid use of temperatures at which such undesirable side reactions remarkably occur. The heating time cannot be uniquely indicated because it varies depending on the composition and molecular weight of the (A) arylene sulfide prepolymer and the environment during heating. Preferably, the time is set so that the undesirable side reactions occur minimally. The heating time is, for example, 0.01 to 100 hours, preferably 0.1 to 20 hours, more preferably 0.1 to 10 hours. When the heating time is shorter than 0.01 hours, the reaction between the (A) arylene sulfide prepolymer and the (B) compound is likely to be insufficient. When the heating time is over 100 hours, there is a tendency to increase the possibility of adverse effects on the properties of the obtained polyarylene sulfide copolymer due to undesirable side reactions, as well as economic disadvantages.

A functional group contained in the (A) arylene sulfide prepolymer and X contained in the (B) compound are preferably reacted to form an imide group. The combination to form an imide group is not particularly restricted as long as it forms imide group. Preferably, the combination of the functional group contained in the (A) arylene sulfide prepolymer and X contained in the (B) compound is preferably a combination of an acid anhydride group and amino group, or carboxyl group and amino group. In particular, combinations of anhydride and amino groups are preferred. For example, when the (A) component has an acid anhydride group, X contained in the (B) component is preferably an amino group, while when the (A) component has an amino group, X contained in the (B) component is preferably an acid anhydride group.

The heating step in the production method is preferably performed in the absence of solvents from the viewpoint of preventing contamination of the molded product due to gas generated during molding processes. Without being limited to the above-described method, the heating step can also be performed in the presence of solvents. The solvents are not particularly restricted as long as they do not substantially cause undesirable side reactions such as decomposition and crosslinking in the produced polyarylene sulfide copolymer. Examples of such solvents include nitrogen-containing polar solvents such as N-methyl-2-pyrrolidone, dimethylformamide, and dimethylacetamide; sulfoxide- and sulfone-based solvents such as dimethyl sulfoxide, and dimethyl sulfone; ketone-based solvents such as acetone, methyl ethyl ketone, diethyl ketone, and acetophenone; ether-based solvents such as dimethyl ether, dipropyl ether, and tetrahydrofuran; halogen-based solvents such as chloroform, methylene chloride, trichloroethylene, ethylene dichloride, dichloroethane, tetrachloroethane, chlorobenzene; alcohol- and phenol-based solvents such as methanol, ethanol, propanol, butanol, pentanol, ethylene glycol, propylene glycol, phenol, cresol, and polyethylene glycol; and aromatic hydrocarbon solvents such as benzene, toluene, and xylene. Inorganic compounds such as carbon dioxide, nitrogen, and water in a state of supercritical fluid can also be used as the solvents. These solvents can be used alone or as a mixture of two or more.

The heating step in the production method can be performed not only in a manner using a usual polymerization reaction device, but also in the mold of producing the molded product, or using any device equipped with a heating mechanism such as using an extruder or a melt kneader, including known processes such as batch process and continuous process.

Preferably, the heating step in the present production method is performed under a non-oxidizing atmosphere, and also preferably under reduced pressure conditions. When the heating step is performed under reduced pressure conditions, it is preferable to change the atmosphere in the reaction system to a non-oxidizing atmosphere and then to reduced pressure conditions. By this, undesirable side reactions such as crosslinking reactions and decomposition reactions, for example, between polyarylene sulfide prepolymers tends to be prevented from occurring. The term "a non-oxidizing atmosphere" refers to an atmosphere in which the gas phase has an oxygen concentration of 5% by volume or less, preferably 2% by volume or less, and more preferably substantially no oxygen, i.e., an inert gas atmosphere such as nitrogen, helium or argon, particularly preferably a nitrogen atmosphere from the viewpoint of economy and ease of handling. The term "under reduced pressure conditions" means that the reaction system is under a pressure lower than atmospheric pressure, and the upper limit is preferably 50 kPa or less, more preferably 20 kPa or less, still more preferably 10 kPa or less. The lower limit is, for example, 0.1 kPa or more. When the reduced pressure conditions are below the preferred upper limit, undesirable side reactions such as crosslinking reactions tend to be prevented, and when the reduced pressure conditions are over the preferred lower limit, loads from the reduced pressure is not applied on the reaction device more than necessary, which are preferred.

The arylene sulfide unit in the polyarylene sulfide copolymer is derived from the (A) arylene sulfide prepolymer, and the number average molecular weight of the arylene sulfide unit in the polyarylene sulfide copolymer is equal to the number average molecular weight of the (A) arylene sulfide prepolymer.

Resin Composition

The polyarylene sulfide copolymer can be used as a polyarylene sulfide resin composition by mixing it with fillers and other additives. The mixing method in production of the resin composition is not particularly restricted, and represented by a method comprising supplying the materials into a known melt kneader, including a uniaxial or biaxial extruder, a Banbury mixer, a kneader, and a mixing roll, and kneading the mixture at a process temperature of 5 to 100° C. higher than the melting peak temperature of the polyarylene sulfide copolymer.

The polyarylene sulfide resin composition containing the polyarylene sulfide copolymer can contain fillers. Examples of the fillers include inorganic fillers and organic fillers.

Examples of the inorganic fillers include fibrous inorganic fillers such as glass fiber, glass milled fiber, carbon fiber, potassium titanate whisker, zinc oxide whisker, calcium carbonate whisker, wollastonite whisker, aluminum borate whisker, alumina fiber, silicon carbide fiber, ceramic fiber, gypsum fiber, metallic fiber, and basalt fiber; and non-fibrous inorganic fillers such as talc, wollastonite, zeolite, sericite, mica, kaolin, clay, ferrite, pyrophyllite, bentonite, alumina silicate, silicon oxide, magnesium oxide, alumina, zirconium oxide, titanium oxide, iron oxide, magnesium oxide, calcium carbonate, magnesium carbonate, dolomite, calcium sulfate, barium sulfate, calcium hydroxide, magnesium hydroxide, aluminum hydroxide, glass bead, glass flake, glass powder, ceramic bead, boron nitride, silicon nitride, silicon carbide, aluminum silicate, calcium silicate, silica, graphite, and carbon black.

Examples of the organic fillers include fibrous organic fillers such as polyethylene fiber, polypropylene fiber, polyester fiber, polyamide fiber, polyaramide fiber, fluorine resin fiber, thermosetting resin fiber, epoxy resin fiber, polyvinylidene chloride-based fiber, polyvinylidene difluoride-based fiber, and cellulose fiber; and non-fibrous organic fillers such as ebonite powder, cork powder, and wood powder.

These inorganic and organic fillers may be hollow. The fillers can be used alone or in combination of two or more. Further, the fillers may be pre-treated with coupling agents such as isocyanate-based compounds, organic silane-based compounds, organic titanate-based compounds, organic borane-based compounds, and epoxy compounds before use.

The type of the filler is not specified, and is preferably fibrous inorganic fillers such as glass fiber and carbon fiber in consideration of the reinforcing effect of the filler as a resin composition. Carbon fiber not only improves the mechanical properties, but also reduce the weight of molded products. When the filler is carbon fiber, the resin composition preferably exhibits greater effects of improving the mechanical properties and chemical resistance. Among PAN-based, PITCH-based, and rayon-based carbon fibers, PAN-based carbon fiber is preferred from the viewpoint of the balance between the strength and elastic modulus of the molded product The following compounds can be added to the polyarylene sulfide resin composition for the purpose of modification. The compound that can be added include plasticizing agents such as olefin-based copolymers, alkoxy silane compounds, isocyanate-based compounds, organic titanate-based compounds, organic borane-based compounds, polyalkylene oxide oligomer-based compounds, thioether-based compounds, ester-based compounds, and organic phosphorus-based compounds; crystal nucleating agents such as talc, kaolin, organophosphorus compounds, and polyether ether ketone; metallic soaps such as montanic acid waxes, lithium stearate, and aluminum stearate; mold releasing agents such as polycondensation of ethylene diamine, stearic acid, and sebacic acid, and silicone-based compounds; anti-coloring agents such as hypophosphite; and additives such as lubricants, anti-UV agents, antioxidants, flame retardants, coloring agents, and foaming agents.

The obtained polyarylene sulfide copolymer is excellent in heat resistance, chemical resistance, flame retardance, electrical properties, and mechanical properties, and not only can be used in injection molding, injection-compression molding, blow molding, but also can be molded into extrusion-molded products such as sheet, film, fiber, and pipe by extrusion molding.

Examples of the application of the resin composition using the polyarylene sulfide copolymer include electric and electronic parts, parts for audio equipment, parts for household and office electric appliances, machine-related parts, optical equipment-related parts and precision machine-related parts, parts for plumbing, automobile-related parts and vehicle-related parts, aerospace-related parts, and various other applications.

EXAMPLE

Our methods will be described in more detail with reference to Examples and Comparative Examples, but is not limited thereto only.

Preparation of Film

Amorphous Film

The conditions for preparing a pressed amorphous film are described below. Polyarylene sulfide and a polyarylene sulfide copolymer were used as samples. The samples and a spacer (about 0.3 mm aluminum plate) were sandwiched between polyimide films. The samples were sandwiched together with the polyimide films between press molds that had been heated above the melting point of the samples, and pressurized for 1 minute. After one-minute pressurization and retention, the samples were taken out together with the polyimide films, and soaked in a prepared water and rapidly cooled to obtain an amorphous film.

Crystallized Film

Polyarylene sulfide and a polyarylene sulfide copolymer were used as samples. The samples and a spacer (about 0.3 mm aluminum plate) were sandwiched between polyimide films. The samples were sandwiched together with the polyimide films between press molds that had been heated to the melting point of the samples+30° C., and pressurized for 1 minute. After one-minute pressurization and retention, the samples were removed together with the polyimide films, and sandwiched between metal plates that had been heated to the glass transition temperature+30° C. and pressurized for 5 minutes for crystallization to obtain a crystallized film.

Measurement of Glass Transition Temperature and Melting Point

An amorphous film (thickness: 0.3 mm) of polyarylene sulfide and a polyarylene sulfide copolymer was prepared by the above method, and its glass transition temperature (Tg) and melting point (Tm) were measured using a differential scanning calorimeter (PerkinElmer, Inc., DSC7).

The glass transition temperature was measured with the DSC under the following conditions: The amorphous film obtained by the above method was heated from 0° C. to 340° C. at a rate of 20° C./min. The flexion point of the baseline shift detected during the heating step was the glass transition temperature.

The melting point was measured with the DSC under the following conditions: The amorphous film obtained by the above method was heated from 0° C. to 340° C. at a rate of 20° C./min. Then, the film was held at 340° C. for 1 minute, and cooled to 100° C. at a rate of 20° C./min. Then, the film was held at 100° C. for 1 minute, and heated from 100° C. to 340° C. at a rate of 20° C./min. The melting peak temperature detected during the heating step was the melting point.

Solvent Resistance Test

The crystallized film prepared in the above method is cut into 1 cm×1 cm pieces, and immersed in 100 g of N-methyl-2-pyrrolidone (NMP) that had been heated to 80° C. After keeping the liquid temperature at 80° C. for 20 minutes, the dissolution state of the film was visually checked.

The results are indicated by the following symbols:
A: Insoluble;
B: Partly soluble or swollen;
C: Soluble.

Measurement of Molecular Weight

The number average molecular weight (Mn) and the weight average molecular weight Mw of polyarylene sulfide, a polyarylene sulfide copolymer, and an arylene sulfide prepolymer were calculated in terms of polystyrene by gel permeation chromatography (GPC), a type of size exclusion chromatography (SEC). The measurement conditions in GPC are shown below:

Equipment: SSC-7110, from Senshu Scientific co., ltd.
Column: Shodex UT806M×2
Eluent: 1-chloronaphthalene
Detector: differential refractive index detector
Temperature of Column: 210° C.
Temperature of Pre Oven: 250° C.
Temperature of Pump Oven: 50° C.
Temperature of Detector: 210° C.
Flow Rate: 1.0 mL/min
Sample Injection: 300 μL.

Measurement of Storage Modulus Reduction Temperature

The temperature dependence of storage modulus of polyarylene sulfide and a polyarylene sulfide copolymer was determined using a viscoelasticity measuring device under the following conditions:

Equipment: DMS6100 (from Seiko Instruments Inc.)
Measurement Mode: tensile mode
Frequency: 1.0 Hz
Sampling Rate: 3.0 s
Sample: prepared by cutting the crystallized film prepared in the above method into 8 mm×20 mm pieces.
Atmosphere: under a nitrogen gas flow (100 mL/min)
Measurement Conditions: the programmed temperature was heated from 50° C. to 250° C.

During the heating, the temperature rose at a rate of 2° C./min.

The temperature at which the storage modulus E' was 90% of the value at 50° C. is considered as $T_{90}$, which was considered an index of the temperature at which the storage modulus decreases.

Injection Molding

Polyarylene sulfide and the polyarylene sulfide copolymer were molded into a dumbbell specimen (IS0527-2-1A) using an injection molding machine from Sumitomo Heavy Industries (SE75DUZ-C250) at a resin temperature of 310° C. and a mold temperature of 130° C.

Tensile Test

The dumbbell specimen (ISO 527-2-1A) obtained by the injection molding was measured for its tensile strength according to ISO 527-1 using a universal testing machine from Shimadzu Corporation, AG-50kNx, under conditions of testing rate: 5 mm/min, and dry heating at an atmosphere temperature of 100° C., and the average value of three measurements was calculated.

Flexural Test

The dumbbell specimen (ISO 527-2-1A) obtained by the injection molding was measured for its flexural modulus according to ISO 527-1 using a universal testing machine from Shimadzu Corporation, AG-50kNx, under conditions of testing rate: 2 mm/min, and dry heating at an atmosphere temperature of 100° C., and the average value of three measurements was calculated.

Reference Example 1

To a 70 L autoclave equipped with a stirrer and a bottom stop valve, 8.27 kg (70.0 mol) of 47.5% sodium hydrosulfide, 3.14 kg (75.5 mol) of 96% sodium hydroxide, 11.45 kg (115.50 mol) of N-methyl-2-pyrrolidone (NMP), and 5.5 kg of ion exchanged water were added, and the mixture was slowly heated to 225° C. for about 3 hours at atmospheric pressure under nitrogen gas flow, thereby distilling out 9.82 kg of water and 0.28 kg of NMP. At this time, the heating was stopped and cooling started. The amount of water remaining in the system at this time per mole of alkali metal hydrosulfide added, including water consumed in NMP hydrolysis, was 1.01 mol. The amount of hydrogen sulfide dispersed was 1.4 mol, and thus the amount of the sulfurizing agent in the system after this step was 68.6 mol.

After cooling to 200° C., 9.28 kg (65.1 mol) of p-dichlorobenzene (p-DCB), 2.88 kg (15.8 mol) of 4-chlorophthalic anhydride, and 9.37 kg (94.50 mol) of NMP were added. After sealing the reactor under nitrogen gas, the mixture was heated to 275° C. at a rate of 0.6° C./min while stirring at 240 rpm and allowed to react at 275° C. for 60 minutes.

After completion of the reaction, the bottom stop valve of the autoclave was immediately opened to flash the content into an apparatus with a stirrer. In the apparatus with a stirrer, the content was evaporated to dryness at 230° C. for 1.5 hours until 95% or more of NMP used in polymerization was removed to obtain a solid containing PPS and salts.

The obtained product and 74 L of ion exchange water were added to an autoclave with a stirrer, washed at 75° C. for 15 minutes, and filtered to obtain a cake. The obtained cake was washed with ion exchanged water at 75° C. for 15 minutes and filtered for 3 times. After addition of the cake, 74 L of ion exchanged water, and 0.5 kg of acetic acid to an autoclave with a stirrer, the inside of the autoclave was replaced with nitrogen, and heated to 195° C. Then, the autoclave was cooled and the content was removed. The content was filtered to obtain a cake. The obtained cake was dried at 120° C. for 4 hours under a nitrogen gas flow to obtain a dried arylene sulfide prepolymer (A-1). The arylene sulfide prepolymer (A-1) had a glass transition temperature of 80.2° C., a melting point of 272.7° C., and a number average molecular weight of 4500. The FT-IR spectrum revealed that the arylene sulfide prepolymer (A-1) had a phenylene sulfide unit as a constitutional unit and had an acid anhydride group introduced therein.

Example 1

First, 4 g of arylene sulfide prepolymer (A-1) (terminal acid anhydride: 2.0 mmol) from Reference Example 1 and 0.25 g of 4,4'-diaminodiphenylsulfone (DDS) (1.0 mmol) were added in a glass test tube with an agitator blade that can be vacuumed and nitrogen-replaced, and then the test tube was vacuumed and nitrogen-replaced repeatedly three times. The test tube was filled with a nitrogen atmosphere, heated at 320° C. with stirring for 20 minutes, and then cooled to room temperature to obtain a polymerized product. The FT-IR spectrum revealed that the obtained polymerized product contained a phenylene sulfide unit as a structural unit and had imide and sulfonyl groups derived from the copolymeric component introduced therein. The obtained polyphenylene sulfide copolymer contained 2.5 mol % of the copolymeric component. The results of the weight average molecular weight, glass transition temperature, melting point, storage modulus reduction temperature, and solvent resistance tests are as shown in Table 1.

The number average molecular weight of the phenylene sulfide unit constituting the obtained polyphenylene sulfide copolymer is the same as that of the arylene sulfide prepolymer (A-1) used in the polymerization. The same applies to Examples 2 to 14 below.

Example 2

First, 4 g of arylene sulfide prepolymer (A-1) (terminal acid anhydride: 2.0 mmol) from Reference Example 1 and 0.21 g of 4,4'-diaminobenzophenone (DAB) (1.0 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 20 minutes with stirring, and then cooled to room temperature to obtain a polymerized product. The FT-IR spectrum revealed that this product contained a phenylene sulfide unit as a structural unit and had imide and ketone groups derived from the copolymeric component introduced therein. The obtained polyphenylene sulfide copolymer contained 2.3 mol % of the copolymeric component. The results of the weight average molecular weight, glass transition temperature, melting point, storage modulus reduction temperature, and solvent resistance tests are as shown in Table 1.

Example 3

First, 4 g of arylene sulfide prepolymer (A-1) (terminal acid anhydride: 2.0 mmol) from Reference Example 1 and 0.20 g of 2,7-diaminofluorene (DAF) (1.0 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 20 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 2.4 mol % of the copolymeric component. The results of the weight average molecular weight, glass transition temperature, melting point, storage modulus reduction temperature, and solvent resistance tests are as shown in Table 1.

Reference Example 2

To a 70 L autoclave equipped with a stirrer and a bottom stop valve, 8.27 kg (70.00 mol) of 47.5% sodium hydrosulfide, 2.91 kg (69.80 mol) of 96% sodium hydroxide, 11.45 kg (115.50 mol) of N-methyl-2-pyrrolidone (NMP), 10.5 kg of ion exchanged water were added, and the mixture was slowly heated to 245° C. for about 3 hours at atmospheric pressure under nitrogen gas flow, thereby distilling out 14.78 kg of water and 0.28 kg of NMP. The reactor was then cooled to 200° C. The amount of water remaining in the system per mole of alkali metal sulfide added, including water consumed in NMP hydrolysis, was 1.06 mol. The amount of hydrogen sulfide dispersed was 0.02 mol per mole of alkali metal sulfide added.

After cooling to 200° C., 10.48 kg (71.27 mol) of p-dichlorobenzene and 9.37 kg (94.50 mol) of NMP were added. After sealing the reactor under nitrogen gas, the mixture was heated from 200° C. to 270° C. at a rate of 0.6° C./min while stirring at 240 rpm. After the reaction at 270° C. for 100 minutes, the bottom stop valve of the autoclave was opened to flash the content into a vessel with a stirrer under pressure with nitrogen over 15 minutes. The content was stirred at 250° C. for a period of time until most of NMP was removed.

The obtained solid and 76 L of ion exchange water were placed in an autoclave with a stirrer, washed at 70° C. for 30 minutes, and then suction-filtered through a glass filter. Then, 76 L of ion exchange water heated to 70° C. was poured into the glass filter and suction-filtrated to obtain a cake.

The obtained cake and 90 L of ion exchanged water were added to an autoclave with a stirrer, then acetic acid was added to adjust the pH to 7. After replacing the inside of the autoclave with nitrogen, the mixture was heated to 192° C. and held for 30 minutes. Then, the autoclave was cooled and the content was removed.

The content was suction-filtered through a glass filter, to which 76 L of ion exchange water at 70° C. was poured and suction-filtered to obtain a cake. The obtained cake was dried at 120° C. under a nitrogen gas flow to obtain a dried PPS-1.

Reference Example 3

To a 70 L autoclave equipped with a stirrer, 8267.37 g (70.00 mol) of 47.5% sodium hydrosulfide, 2957.21 g (70.97 mol) of 96% sodium hydroxide, 11434.50 g (115.50 mol) of N-methyl-2-pyrrolidone (NMP), 2583.00 g (31.50 mol) of sodium acetate, and 10500 g of ion exchanged water were added, and the mixture was slowly heated to 245° C. for about 3 hours at atmospheric pressure under nitrogen gas flow, thereby distilling out 14780.1 g of water and 280 g of NMP. The reactor was then cooled to 160° C. The amount of water remaining in the system per mole of alkali metal sulfide added, including water consumed in NMP hydrolysis, was 1.06 mol. The amount of hydrogen sulfide dispersed was 0.02 mol per mole of alkali metal sulfide added.

Then, 10235.46 g (69.63 mol) of p-dichlorobenzene and 9009.00 g (91.00 mol) of NMP were added. After sealing the reactor under nitrogen gas, the mixture was heated to 238° C. at a rate of 0.6° C./min while stirring at 240 rpm. After the reaction at 238° C. for 95 minutes, the reaction mixture was heated to 270° C. at a rate of 0.8° C./min. After the reaction at 270° C. for 100 minutes, the reaction mixture was cooled to 250° C. at a rate of 1.3° C./min with injection of 1260 g (70 mol) of water under pressure over 15 minutes. The reaction mixture was cooled to 200° C. at a rate of 1.0° C./min and then rapidly cooled to around room temperature.

The content was removed, diluted with 26,300 g of NMP, filtered through a sieve (80 mesh) to separate the solvent and a solid, and the obtained particles were washed with 31,900 g of NMP followed by filtration. The resulting product was washed several times with 56,000 g of ion exchanged water, followed by filtration. After washing with 70,000 g of ion exchanged water and filtration, the obtained water-containing PPS particles were hot-air dried at 80° C. and then vacuum-dried at 120° C. to obtain PPS-2.

Reference Example 4

First, 80 g of PPS-1 from Reference Example 2 and 20 g of 4,4'-thiodianiline (TDA) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 340° C. for 60 minutes with stirring. The test tube was heated at 320° C. and vacuumed for 15 minutes with stirring to remove the residual TDA, thereby obtaining an arylene sulfide prepolymer (A-2). The arylene sulfide prepolymer had a glass transition temperature of 58.9° C., a melting point of 270.7° C., and a number average molecular weight of 2400. The FT-IR spectrum revealed that the arylene sulfide prepolymer (A-2) had a phenylene sulfide unit as a constitutional unit and had an amino group introduced therein.

Reference Example 5

First, 80 g of PPS-2 from Reference Example 3 and 12 g of 4,4'-thiodianiline (TDA) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 340° C. for 180 minutes with stirring to obtain an arylene sulfide prepolymer (A-3). The arylene sulfide prepolymer had a glass transition temperature of 59.1° C., a melting point of 271.3° C., and a number average molecular weight of 2500. The FT-IR spectrum revealed that the arylene sulfide prepolymer (A-3) had a phenylene sulfide unit as a constitutional unit and had an amino group introduced therein.

Reference Example 6

First, 80 g of PPS-2 from Reference Example 3 and 18 g of 3,3',4,4'-thiodiphthalic dianhydride (TPDA) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 340° C. for 180 minutes with stirring to obtain an arylene sulfide prepolymer (A-4). The arylene sulfide prepolymer had a glass transition temperature of 61.3° C., a melting point of 269.1° C., and a number average molecular weight of 2600. The FT-IR spectrum revealed that the arylene sulfide prepolymer (A-4) had a phenylene sulfide unit as a constitutional unit and had an acid anhydride group introduced therein.

Reference Example 7

First, 80 g of PPS-1 from Reference Example 2 and 25 g of 4,4'-thiodianiline (TDA) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 340° C. for 180 minutes while stirring to obtain an arylene sulfide prepolymer (A-5). The arylene sulfide prepolymer had a glass transition temperature of 56.7° C., a melting point of 271.2° C., and a number average molecular weight of 1100. The FT-IR spectrum revealed that the arylene sulfide prepolymer (A-5) had a phenylene sulfide unit as a constitutional unit and had an amino group introduced therein.

Example 4

First, 4 g of arylene sulfide prepolymer (A-2) (terminal amino group: 4.8 mmol) from Reference Example 4 and 0.52 g of pyromellitic dianhydride (PDA) (2.4 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 4.3 mol % of the copolymeric component. The results of the weight average molecular weight, glass transition temperature, melting point, storage modulus reduction temperature, and solvent resistance tests are as shown in Table 1.

Example 5

First, 4 g of arylene sulfide prepolymer (A-3) (terminal amino group: 4.3 mmol) from Reference Example 5 and 0.48 g of pyromellitic dianhydride (PDA) (2.2 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 4.4 mol % of the copolymeric component. The results of the weight average molecular weight, glass transition temperature, melting point, storage modulus reduction temperature, and solvent resistance tests are as shown in Table 1.

Example 6

First, 4 g of arylene sulfide prepolymer (A-3) (terminal amino group: 4.3 mmol) from Reference Example 5 and 0.71 g of 3,3',4,4'-benzophenonetetracarboxylic dianhydride (BTDA) (2.2 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 4.2 mol % of the copolymeric component. The results of the weight average molecular weight, glass transition temperature, melting point, storage modulus reduction temperature, and solvent resistance tests are as shown in Table 1.

Example 7

First, 4 g of arylene sulfide prepolymer (A-3) (terminal amino group: 4.3 mmol) from Reference Example 5 and 0.65 g of 3,3',4,4'-biphenyltetracarboxylic dianhydride (BPDA) (2.2 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 4.3 mol % of the copolymeric component. The results of the weight average molecular weight, glass transition temperature, melting point, storage modulus reduction temperature, and solvent resistance tests are as shown in Table 1.

Example 8

First, 4 g of arylene sulfide prepolymer (A-3) (terminal amino group: 4.3 mmol) from Reference Example 5 and 0.79 g of 3,3',4,4'-diphenylsulfonetetracarboxylic dianhydride (DSDA) (2.2 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 4.4 mol % of the copolymeric component. The results of the weight average molecular weight, glass transition temperature, storage modulus reduction temperature, and solvent resistance tests are as shown in Table 1. This polyphenylene sulfide copolymer did not have a clear melting point.

Example 9

First, 4 g of arylene sulfide prepolymer (A-3) (terminal amino group: 4.3 mmol) from Reference Example 5 and 1.01 g of 9,9-bis(3,4-carboxyphenyl)fluorene dianhydride (BPAF) (2.2 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 4.3 mol % of the copolymeric component. The results of the weight average molecular weight, glass transition temperature, storage modulus reduction temperature, and solvent resistance tests are as shown in Table 1. This polyphenylene sulfide copolymer did not have a clear melting point.

Example 10

First, 4 g of arylene sulfide prepolymer (A-4) (terminal acid anhydride group: 4.2 mmol) from Reference Example 6 and 0.52 g of 4,4'-diaminodiphenylsulfone (DDS) (2.1 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes while stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 4.2 mol % of the copolymeric component. The results of the weight average molecular weight, glass transition temperature, melting point, storage modulus reduction temperature, and solvent resistance tests are as shown in Table 1.

Example 11

First, 4 g of arylene sulfide prepolymer (A-5) (terminal amino group: 7.6 mmol) from Reference Example 7 and 1.74 g of 9,9-bis(3,4-carboxyphenyl)fluorene dianhydride (BPAF) (3.8 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 8.0 mol % of the copolymeric component. The results of the weight average molecular weight, glass transition temperature, melting point, storage modulus reduction temperature, and solvent resistance tests are as shown in Table 1.

Reference Example 8

To a 70 L autoclave equipped with a stirrer, 8267.37 g (70.00 mol) of 47.5% sodium hydrosulfide, 2957.21 g (70.97 mol) of 96% sodium hydroxide, 11434.50 g (115.50 mol) of N-methyl-2-pyrrolidone (NMP), 3158.54 g (38.50 mol) of sodium acetate, and 10500 g of ion exchanged water were added, and the mixture was slowly heated to 245° C. for about 3 hours at atmospheric pressure under nitrogen gas flow, thereby distilling out 14780.1 g of water and 280 g of NMP. The reactor was then cooled to 160° C. The amount of water remaining in the system per mole of alkali metal sulfide added, including water consumed in NMP hydrolysis, was 1.06 mol. The amount of hydrogen sulfide dispersed was 0.02 mol per mole of alkali metal sulfide added.

Then, 10235.46 g (69.63 mol) of p-dichlorobenzene and 9009.00 g (91.00 mol) of NMP were added. After sealing the reactor under nitrogen gas, the mixture was heated to 238° C. at a rate of 0.6° C./min while stirring at 240 rpm. After the reaction at 238° C. for 95 minutes, the reaction mixture was heated to 270° C. at a rate of 0.8° C./min. After the reaction at 270° C. for 100 minutes, the reaction mixture was cooled to 250° C. at a rate of 1.3° C./min with injection of 1260 g (70 mol) of water under pressure over 15 minutes. The reaction mixture was cooled to 200° C. at a rate of 1.0° C./min and then rapidly cooled to around room temperature.

The content was removed, diluted with 26,300 g of NMP, filtered through a sieve (80 mesh) to separate the solvent and a solid, and the obtained particles were washed with 31,900 g of NMP followed by filtration. The resulting product was washed several times with 56,000 g of ion exchanged water, followed by filtration. After washing with 70,000 g of ion exchanged water and filtration, the obtained water-containing PPS particles were hot-air dried at 80° C. and then vacuum-dried at 120° C. to obtain PPS-3.

Reference Example 9

First, 80 g of PPS-3 from Reference Example 8 and 12 g of 4,4'-thiodianiline (TDA) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 340° C. for 180 minutes with stirring to obtain an arylene sulfide prepolymer (A-6). The arylene sulfide prepolymer had a glass transition temperature of 59.3° C., a melting point of 270.7° C., and a number average molecular weight of 2500. The FT-IR spectrum revealed that the arylene sulfide prepolymer (A-6) had a phenylene sulfide unit as a constitutional unit and had an amino group introduced therein.

Reference Example 10

A dried arylene sulfide prepolymer (A-7) was obtained in the same manner as in Reference Example 1 except that drying at 120° C. was replaced with drying at 30° C. using a vacuum dryer for 4 hours. The arylene sulfide prepolymer (A-7) had a glass transition temperature of 80.1° C., a melting point of 272.5° C., and a number average molecular weight of 4500. The FT-IR spectrum revealed that the arylene sulfide prepolymer (A-7) had a phenylene sulfide unit as a constitutional unit and had a carboxyl group introduced therein.

Example 12

First, 4 g of arylene sulfide prepolymer (A-6) (terminal amino group: 4.3 mmol) from Reference Example 9 and 0.48 g of pyromellitic dianhydride (PDA) (2.2 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 4.3 mol % of the copolymeric component. The results of the weight average molecular weight, glass transition temperature, melting point, storage modulus reduction temperature, and solvent resistance tests are as shown in Table 1.

Example 13

First, 4 g of arylene sulfide prepolymer (A-3) (terminal amino group: 4.3 mmol) from Reference Example 5 and 0.56 g of pyromellitic acid (PA) (2.2 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an imide group derived from the copolymeric component introduced therein. The obtained polyphenylene sulfide copolymer contained 4.4 mol % of the copolymeric component. The results of the weight average molecular weight, glass transition temperature, melting point, storage modulus reduction temperature, and solvent resistance tests are as shown in Table 1.

Example 14

First, 4 g of arylene sulfide prepolymer (A-7) (terminal carboxyl group: 4.0 mmol) from Reference Example 10 and 0.25 g of 4,4'-diaminodiphenylsulfone (DDS) (1.0 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 20 minutes with stirring, and then cooled to room temperature to obtain a polymerized product. The FT-IR spectrum revealed that the obtained polymerized product contained a phenylene sulfide unit as a structural unit and had imide group and sulfonyl group derived from the copolymeric component introduced therein. The obtained polyphenylene sulfide copolymer contained 2.5 mol % of the copolymeric component. The results of the weight average molecular weight, glass transition temperature, melting point, storage modulus reduction temperature, and solvent resistance tests are as shown in Table 1.

Example 15

First, 4 g of arylene sulfide prepolymer (A-3) (terminal amino group: 4.3 mmol) from Reference Example 5 and 0.60 g of 4, 4'-thiodibenzoic acid (TDBA) (2.2 mmol) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 5 minutes with stirring, and then cooled to room temperature to obtain a polymerized product. The FT-IR spectrum revealed that this product contained a phenylene sulfide unit as a structural unit and had an amide group derived from the copolymeric component introduced therein. The obtained polyphenylene sulfide copolymer contained 4.2 mol % of the copolymeric component. The results of the weight average molecular weight, glass transition temperature, melting point, storage modulus reduction temperature, and solvent resistance tests are as shown in Table 1.

Comparative Example 1

To a 70 L autoclave equipped with a stirrer, 8267.37 g (70.00 mol) of 47.5% sodium hydrosulfide, 2957.21 g (70.97 mol) of 96% sodium hydroxide, 11434.50 g (115.50 mol) of N-methyl-2-pyrrolidone (NMP), 2583.00 g (31.50 mol) of sodium acetate, and 10500 g of ion exchanged water were added, and the resulting mixture was slowly heated to 245° C. for about 3 hours at atmospheric pressure under nitrogen gas flow, thereby distilling out 14780.1 g of water and 280 g of NMP. The reactor was then cooled to 160° C. The amount of water remaining in the system per mole of alkali metal sulfide added, including water consumed in NMP hydrolysis, was 1.06 mol. The amount of hydrogen sulfide dispersed was 0.02 mol per mole of alkali metal sulfide added.

Then, 10235.46 g (69.63 mol) of p-dichlorobenzene and 9009.00 g (91.00 mol) of NMP were added. After sealing the reactor under nitrogen gas, the mixture was heated to 238° C. at a rate of 0.6° C./min while stirring at 240 rpm. After the reaction at 238° C. for 95 minutes, the reaction mixture was heated to 270° C. at a rate of 0.8° C./min. After the reaction at 270° C. for 100 minutes, the reaction mixture was cooled to 250° C. at a rate of 1.3° C./min with injection of 1260 g (70 mol) of water under pressure over 15 minutes. The reaction mixture was cooled to 200° C. at a rate of 1.0° C./min and then rapidly cooled to around room temperature.

The content was removed, diluted with 26,300 g of NMP, filtered through a sieve (80 mesh) to separate the solvent and a solid, and the obtained particles were washed with 31,900 g of NMP followed by filtration. The resulting product was washed several times with 56,000 g of ion exchanged water and filtrated, and then washed with 70,000 g of 0.05 wt % aqueous acetic acid solution and filtrated. After washing with 70,000 g of ion exchanged water and filtration, the obtained water-containing PPS particles were hot-air dried at 80° C. and then vacuum-dried at 120° C. The results of the weight average molecular weight, glass transition temperature, melting point, storage modulus reduction temperature, and solvent resistance tests on the obtained PPS are as shown in Table 1.

Comparative Example 2

First, 2.16 g (5.0 mmol) of diamine represented by the following formula V and 1.63 g (5.0 mmol) of 3,3',4,4'-thiodiphthalic dianhydride (TPDA) were added in a glass test tube with an agitator blade that can be vacuumed and nitrogen-replaced, and then the test tube was vacuumed and nitrogen-replaced repeatedly three times. The test tube was filled with a nitrogen atmosphere and heated at 320° C. for 20 minutes with stirring, and then cooled to room temperature to obtain a polymerized product. The FT-IR spectrum revealed that the polymerized product contained a phenylene sulfide unit as a structural unit and had an imide group derived from the copolymeric component introduced therein. The obtained polyphenylene sulfide copolymer contained 22 mol % of the copolymeric component. The results of the weight average molecular weight, glass transition temperature, melting point, storage modulus reduction temperature, and solvent resistance tests are as shown in Table 1. A sufficiently crystallized film was failed to be obtained in the preparation of crystallized films.

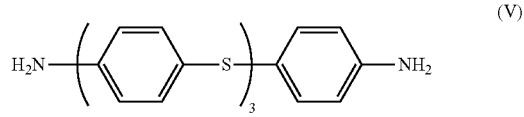

(V)

Comparative Example 3

Synthesis was made in the same manner as in Comparative Example 2 except that 1.79 g (5.0 mmol) of 3,3',4,4'-diphenylsulfonetetracarboxylic dianhydride (DSDA) was used instead of TPDA. The FT-IR spectrum revealed that the polymerized product contained a phenylene sulfide unit as a structural unit and had imide group and sulfonyl group derived from the copolymeric component introduced therein. The obtained polyphenylene sulfide copolymer contained 21 mol % of the copolymeric component. The results of the weight average molecular weight, glass transition temperature, melting point, storage modulus reduction temperature, and solvent resistance tests are as shown in Table 1. A sufficiently crystallized film was not obtained in the preparation of crystallized films.

Comparative Example 4

To a 70 L autoclave equipped with a stirrer, 8267.37 g (70.00 mol) of 47.5% sodium hydrosulfide, 2957.21 g (70.97 mol) of 96% sodium hydroxide, 11434.50 g (115.50 mol) of N-methyl-2-pyrrolidone (NMP), 2583.00 g (31.50 mol) of sodium acetate, and 10500 g of ion exchanged water were added, and the resulting mixture was slowly heated to 245° C. for about 3 hours at atmospheric pressure under nitrogen gas flow, thereby distilling out 14780.1 g of water and 280 g of NMP. The reactor was then cooled to 160° C. Then, 10235.46 g (69.63 mol) of p-dichlorobenzene and 9009.00 g (91.00 mol) of NMP were added. After sealing the reactor under nitrogen gas, the mixture was heated to 238° C. at a rate of 0.6° C./min while stirring at 240 rpm. After the reaction at 238° C. for 180 minutes, the reaction mixture was cooled to 160° C. Then, 8800 g (35.00 mol) of 4,4'-dichlorobenzophenone, 3436.9 g (29.1 mol) of 47.5% sodium hydrosulfide, and 7623 g (77.0 mol) of NMP were added. After sealing the reactor under nitrogen gas, the mixture was heated to 238° C. at a rate of 0.6° C./min while stirring at 240 rpm. After the reaction at 238° C. for 90 minutes, the reaction mixture was heated to 270° C. at a rate of 0.8° C./min. After the reaction at 270° C. for 100 minutes, the reaction mixture was cooled to 250° C. at a rate of 1.3° C./min with injection of 1260 g (70 mol) of water under pressure over 15 minutes. The reaction mixture was cooled to 200° C. at a rate of 1.0° C./min and then rapidly cooled to around room temperature.

The content was removed, diluted with 26,300 g of NMP, filtered through a sieve (80 mesh) to separate the solvent and a solid, and the obtained particles were washed with 31,900 g of NMP followed by filtration. The resulting product was washed several times with 56,000 g of ion exchanged water and filtrated, and then washed with 70,000 g of 0.05 wt % aqueous acetic acid solution and filtrated. After washing with 70,000 g of ion exchanged water and filtration, the obtained water-containing PPS and PPSK (polyphenylene sulfide ketone) copolymer particles were hot-air dried at 80° C. and then vacuum-dried at 120° C. The obtained polyphenylene sulfide copolymer contained 31 mol % of the copolymeric component. The results of the weight average molecular weight, glass transition temperature, melting point, storage modulus reduction temperature, and solvent resistance tests on the obtained PPS and PPSK copolymer are as shown in Table 1.

TABLE 1

|  | Example 1 | Example 2 | Example 3 | Example 4 | Example 5 | Example 6 | Example 7 |
|---|---|---|---|---|---|---|---|
| (A) Arylene sulfide prepolymer | Reference Example 1 (A-1) | Reference Example 1 (A-1) | Reference Example 1 (A-1) | Reference Example 4 (A-2) | Reference Example 5 (A-3) | Reference Example 5 (A-3) | Reference Example 5 (A-3) |
| (B) Compound | DDS | DAB | DAF | PDA | PDA | BTDA | BPDA |
| Mw | 24000 | 28000 | 23000 | 32000 | 60000 | 66000 | 55000 |
| Tg | 99° C. | 99° C. | 97° C. | 112° C. | 122° C. | 125° C. | 120° C. |
| Tm | 272° C. | 264° C. | 271° C. | 257° C. | 248° C. | 205° C. | 214° C. |
| $T_{90}$ | 97° C. | 97° C. | 96° C. | 109° C. | 119° C. | 124° C. | 118° C. |
| Solvent resistance test | A | A | A | A | A | A | A |

|  | Example 8 | Example 9 | Example 10 | Example 11 | Example 12 | Example 13 | Example 14 |
|---|---|---|---|---|---|---|---|
| (A) Arylene sulfide prepolymer | Reference Example 5 (A-3) | Reference Example 5 (A-3) | Reference Example 6 (A-4) | Reference Example 7 (A-5) | Reference Example 9 (A-6) | Reference Example 5 (A-3) | Reference Example 10 (A-7) |
| (B) Compound | DSDA | BPAF | DDS | BPAF | PDA | PA | DDS |
| Mw | 61000 | 59000 | 68000 | 60000 | 76000 | 61000 | 23000 |
| Tg | 126° C. | 139° C. | 123° C. | 155° C. | 127° C. | 120° C. | 98° C. |
| Tm | — | — | 253° C. | — | — | 250° C. | 270° C. |
| $T_{90}$ | 122° C. | 135° C. | 118° C. | 151° C. | 124° C. | 117° C. | 95° C. |
| Solvent resistance test | A | A | A | A | A | A | A |

|  | Example 15 | Comparative Example 1 | Comparative Example 2 | Comparative Example 3 | Comparative Example. 4 |
|---|---|---|---|---|---|
| (A) Arylene sulfide prepolymer | Reference Example 5 (A-3) | — | Formula (V) | Formula (V) | — |
| (B) Compound | TDBA | — | TPDA | DSDA | — |
| Mw | 50000 | 73000 | 65000 | 63000 | 28000 |
| Tg | 105 | 90° C. | 195° C. | 200° C. | 111° C. |
| Tm | 251° C. | 278° C. | 206° C. | 207° C. | 338° C. |
| $T_{90}$ | 100° C. | 89° C. | 185° C. | 194° C. | 109° C. |
| Solvent resistance test | A | A | C | C | A |

The polyarylene sulfide copolymer obtained in Example 5 and the polyphenylene sulfide obtained in Comparative Example 1 were injection-molded, and the obtained product was subjected to tensile and flexural tests at 100° C., whose results are shown in Table 2.

TABLE 2

| Test Temperature | Evaluation Item |  | Example 5 | Comparative Example 1 |
|---|---|---|---|---|
| 100° C. | Tensile strength | MPa | 50.6 | 35.9 |
|  | Flexural modulus | GPa | 2.9 | 0.7 |

As shown in Comparative Example 1 in Table 1, the polyphenylene sulfide without the copolymeric component s showed a low glass transition temperature, and thus showed $T_{90}$, indicative of maintenance of storage modulus, of less than 90° C., leading to decrease in rigidity at high temperature. In addition, as shown in Comparative Examples 2 and 3, when the number average molecular weight (Mn) of the arylene sulfide unit in the polyarylene sulfide copolymer was less than 1000, the copolymer had poor chemical resistance. In addition, when the melting point was over 300° C. as in Comparative Example 4, the polyarylene sulfide copolymer failed to be molded at 300 to 320° C., which is a general molding temperature range for polyphenylene sulfide. On the other hand, as shown in Examples 1 to 9, the polyarylene sulfide copolymers obtained had stable physical properties such as rigidity at high temperature, leading to provision of a polyarylene sulfide copolymer with excellent moldability and chemical resistance.

The invention claimed is:

1. A polyarylene sulfide copolymer having a glass transition temperature of 95° C. or higher and 190° C. or lower, and having a melting point of 300° C. or lower, as measured by differential scanning calorimetry,
    wherein the copolymer comprises as a structural unit arylene sulfide units having a number average molecular weight (Mn) of 1,000 or more and 10,000 or less, the arylene sulfide units are represented as repeating units —(Ar—S)— and a copolymeric component,
    the copolymer contains 80 mol % or more of the repeating units represented by —(Ar—S)—, and
    a crystallized film of the polyarylene sulfide copolymer prepared by sandwiching a sample of the polyarylene sulfide copolymer and a spacer sandwiched between polyimide films,
    sandwiching the sample together with polyimide films between press molds that are heated to a melting point of the sample+30° C., and pressurized for 1 minute, after one-minute pressurization and retention, removing the sample together with the polyimide films and sandwiched between metal plates that is heated to a glass transition temperature+30° C. and pressurized for 5 minutes for crystallization to obtain the crystallized film, is immersed in N-methyl-2-pyrrolidone (NMP)

that is heated to 80° C., and after keeping the liquid temperature at 80° C. for 20 minutes, the crystallized film is insoluble.

2. The polyarylene sulfide copolymer according to claim 1, wherein the copolymeric component comprises as a structural unit at least one structure selected from formulae (a) to (j):

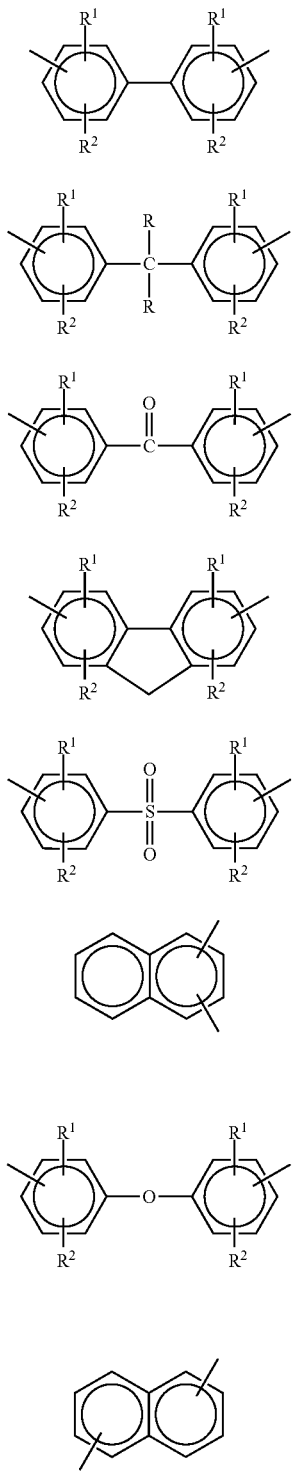

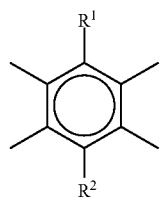

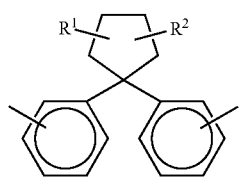

wherein R, $R^1$ and $R^2$, which are the same or different, each represents a substituent selected from hydrogen, a $C_{1-12}$ alkyl group, a $C_{6-24}$ aryl group, and a halogen group.

3. The polyarylene sulfide copolymer according to claim 1, wherein the copolymer comprises at least one linking group selected from a sulfonyl group, a sulfinyl group, an ester group, an amide group, an imide group, an ether group, a urea group, a urethane group, and a siloxane group.

4. A method of producing the polyarylene sulfide copolymer according to claim 1, the method comprising:

mixing (A) an arylene sulfide prepolymer having a number average molecular weight (Mn) of 1,000 or more and 10,000 or less and (B) at least one compound selected from the (a') to (k'):

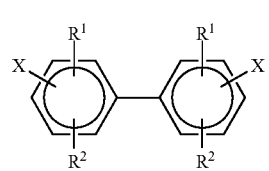

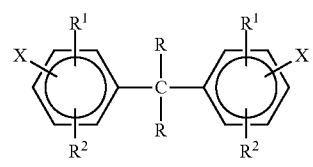

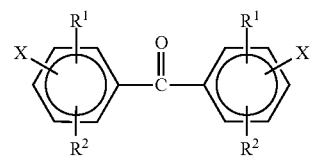

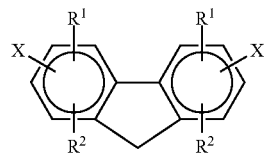

-continued

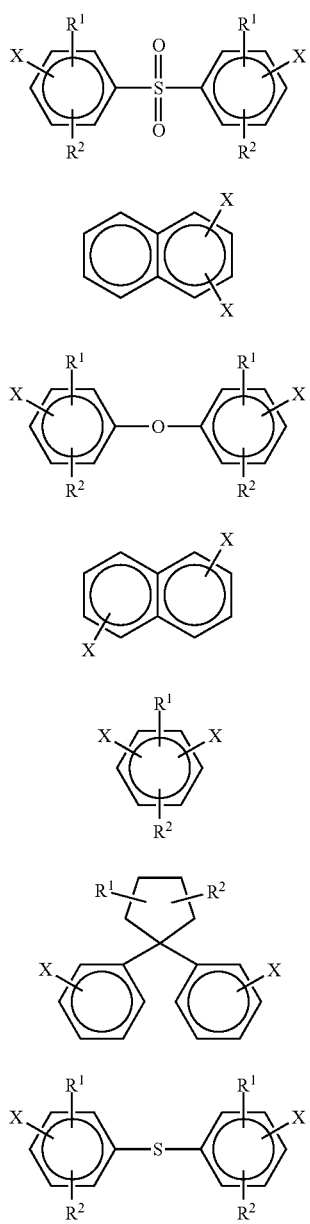

and heating the mixture,
wherein X is any one selected from a hydroxyl group, a carboxyl group, a silanol group, a sulfonic group, an amino group, an acid anhydride group, an acetamide group, a sulfonamide group, a cyano group, an isocyanate group, an aldehyde group, an acetyl group, an epoxy group, and an alkoxy silane group,
R, $R^1$ and $R^2$, which are the same or different, each represents a substituent selected from hydrogen, a $C_{1-12}$ alkyl group, a $C_{6-24}$ aryl group, and a halogen group, and
the aromatic ring in each compound is bi- or tri-substituted product, and the two or more substituents X in the single substituted aromatic ring are the same or different.

5. The method according to claim 4, wherein the (A) arylene sulfide prepolymer has at least one functional group selected from a hydroxyl group, a carboxyl group, a silanol group, a sulfonic group, an amino group, an acid anhydride group, an acetamide group, a sulfonamide group, a cyano group, an isocyanate group, an aldehyde group, an acetyl group, an epoxy group, and an alkoxy silane group.

6. The method according to claim 4, wherein the combination of the functional group contained in the (A) arylene sulfide prepolymer and the substituent X contained in the (B) compound is an acid anhydride group and an amino group, respectively.

7. The method according to claim 4, wherein the heating step is carried out under a substantially solvent-free condition.

8. A resin composition comprising the polyarylene sulfide copolymer accord-ing to claim 1.

9. A molded product comprising the polyarylene sulfide copolymer according to claim 1.

10. The molded product according to claim 9, wherein the molded product is an aerospace component.

11. A molded product comprising the resin composition according to claim 8.

12. The molded product according to claim 11, wherein the molded product is an aerospace component.

13. The polyarylene sulfide copolymer according to claim 1, wherein the arylene sulfide unit and the copolymeric component are linked by an imide group.

14. The polyarylene sulfide copolymer according to claim 2, wherein the copolymer comprises as a structural unit at least one structure selected from the formulae (a), (c), (d), (e), (f), (h), (i) and (j).

15. The method according to claim 4, wherein the (B) is at least one compound selected from the formulae (a'), (c'), (d'), (e'), (f'), (h'), (i') and (j').

* * * * *